(12) United States Patent
Urano et al.

(10) Patent No.: US 11,158,147 B2
(45) Date of Patent: Oct. 26, 2021

(54) AUTONOMOUS CONTROL OF VEHICLE CARGO AREA DOORS

(71) Applicant: Toyota Research Institute, Inc., Los Altos, CA (US)

(72) Inventors: Hiromitsu Urano, Ann Arbor, MI (US); Kentaro Ichikawa, Ann Arbor, MI (US); Kazunori Nimura, Novi, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 5 days.

(21) Appl. No.: 16/503,732

(22) Filed: Jul. 5, 2019

(65) Prior Publication Data

US 2021/0005032 A1   Jan. 7, 2021

(51) Int. Cl.
*G07C 9/00* (2020.01)
*B60R 21/015* (2006.01)
*B60R 5/04* (2006.01)

(52) U.S. Cl.
CPC ............ *G07C 9/00896* (2013.01); *B60R 5/04* (2013.01); *B60R 21/01542* (2014.10); *G07C 2009/0092* (2013.01)

(58) Field of Classification Search
CPC ........ G07C 9/00896; G07C 2009/0092; B60R 5/041; B60R 21/01542
See application file for complete search history.

(56) References Cited

U.S. PATENT DOCUMENTS

| 3,751,086 A * | 8/1973 | Geringer ............... E05B 47/026 292/144 |
| 7,253,715 B2 * | 8/2007 | Bates ...................... G06Q 50/28 340/5.73 |
| 2007/0126561 A1 | 6/2007 | Breed |
| 2009/0132128 A1 | 5/2009 | Marriott et al. |
| 2013/0042532 A1 * | 2/2013 | Aragon ................... E05B 81/10 49/357 |

OTHER PUBLICATIONS

Quigley, "High-Tech Tokyo Taxis Will Sound an Alarm for Left-Behind Luggage," The Diplomat (2013).

* cited by examiner

*Primary Examiner* — Daniell L Negron
(74) *Attorney, Agent, or Firm* — Christopher G. Darrow; Darrow Mustafa PC

(57) ABSTRACT

A cargo area door control system for a vehicle is provided. The vehicle includes at least one cargo area and at least one cargo area door configured to be movable to enable physical access to the at least one cargo area, and movable to block physical access to the at least one cargo area. The control system includes one or more processors and a memory communicably coupled to the one or more processors. The memory stores a cargo area door control module including instructions that when executed by the one or more processors cause the one or more processors to determine if the vehicle currently resides at a selected destination and, responsive to a determination that the vehicle currently resides at the selected destination, operate a cargo area door unlocking mechanism to unlock the at least one cargo area door.

11 Claims, 10 Drawing Sheets

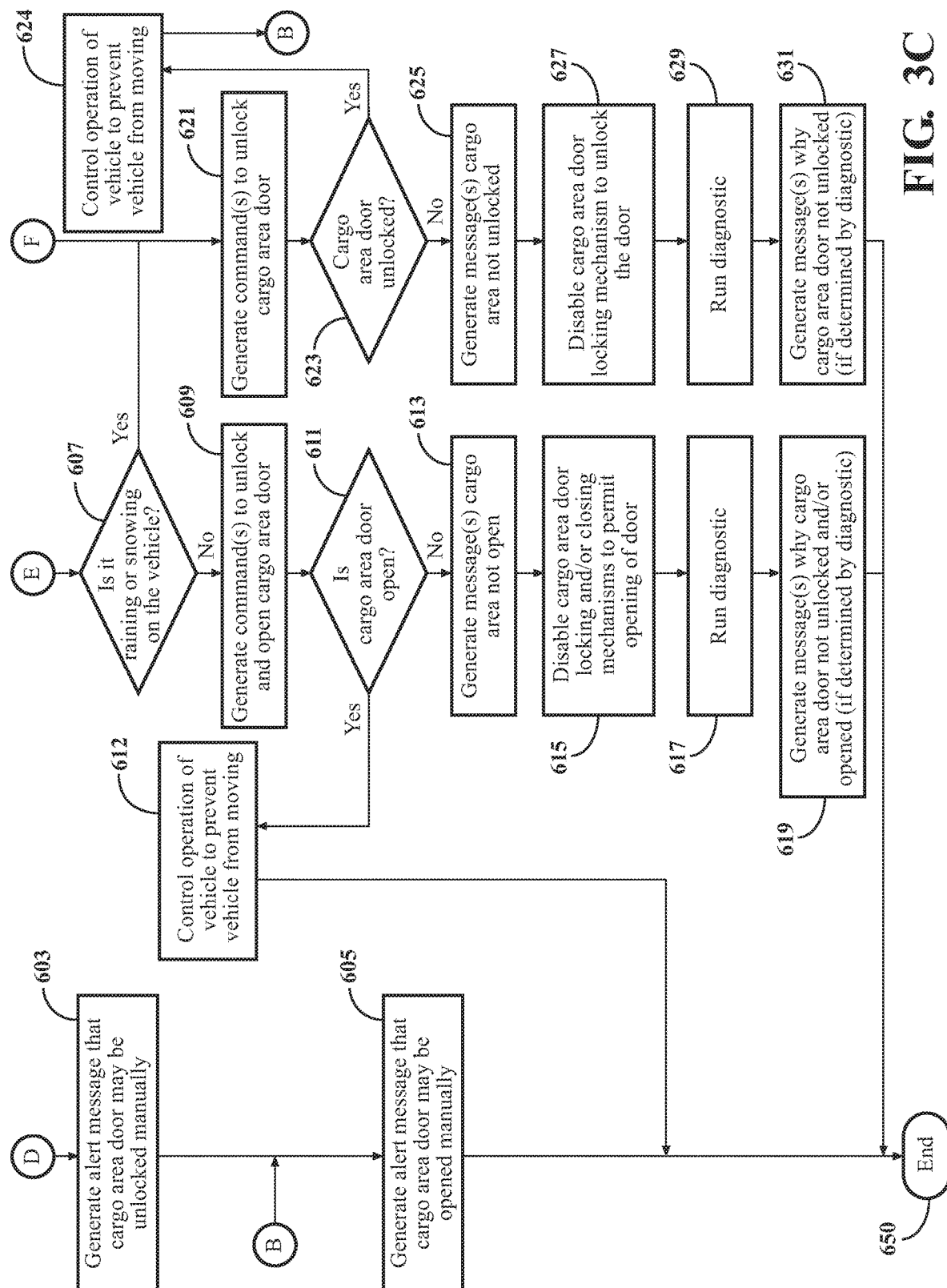

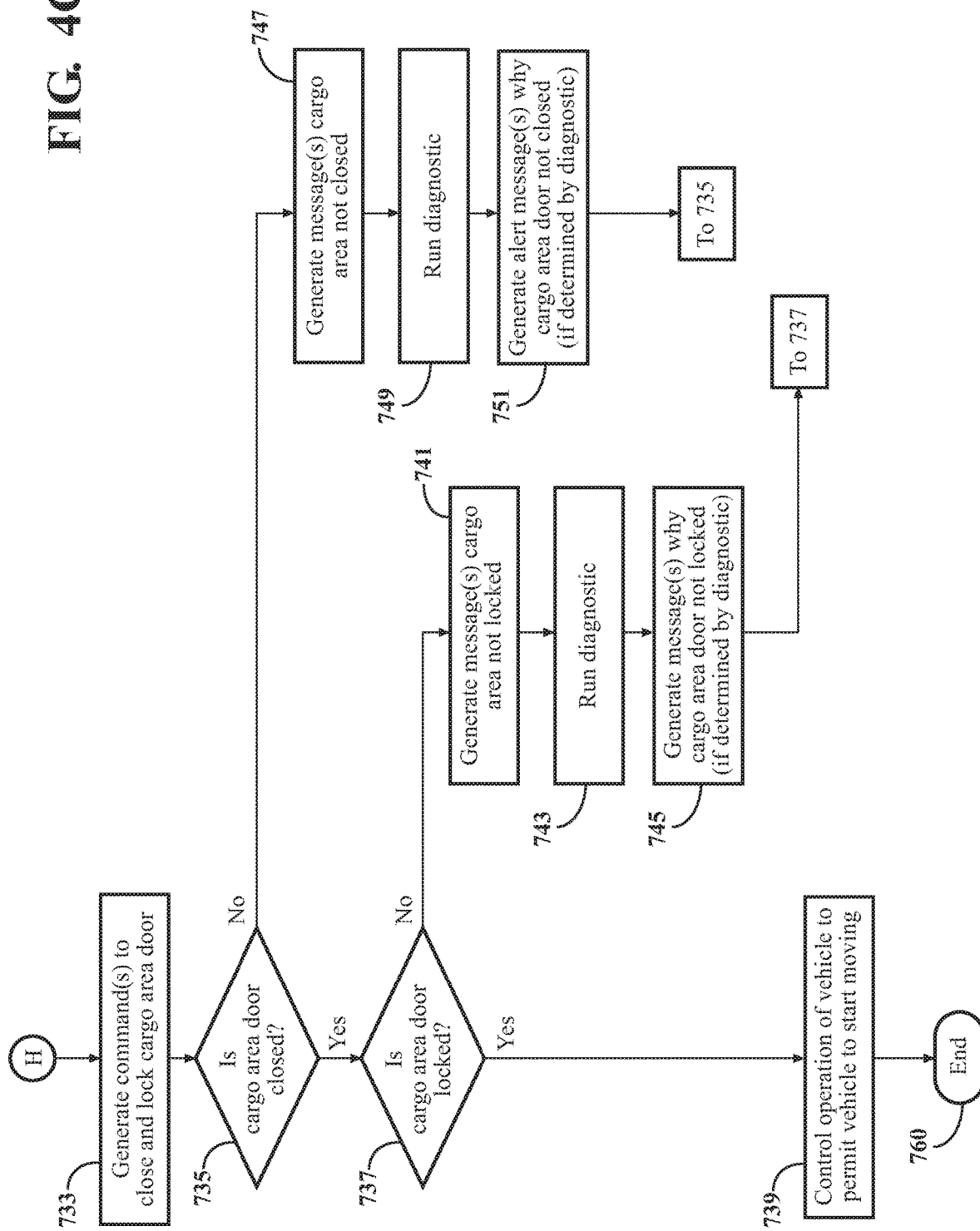

AUTONOMOUS CONTROL OF VEHICLE CARGO AREA DOORS

TECHNICAL FIELD

The present disclosure relates to autonomous control of vehicles and, more particularly, to autonomous control of access to vehicle cargo areas.

BACKGROUND

Autonomous and semi-autonomous vehicles may be configured for self-driving without input from human operators in many driving situations. A vehicle user may wish to control various aspects of vehicle operation in accordance with personal preferences. More specifically, the vehicle user may wish to exercise control over the conditions under which vehicle cargo area doors may autonomously operate.

SUMMARY OF THE INVENTION

In one aspect of the embodiments described herein, a vehicle cargo area door control system is provided. The vehicle includes at least one cargo area and at least one cargo area door configured to be movable to enable physical access to the at least one cargo area, and movable to block physical access to the at least one cargo area. The control system includes one or more processors and a memory communicably coupled to the one or more processors. The memory stores a cargo area door control module including instructions that when executed by the one or more processors cause the one or more processors to determine if the vehicle currently resides at a selected destination and, responsive to a determination that the vehicle currently resides at the selected destination, operate a cargo area door unlocking mechanism to unlock the at least one cargo area door.

In another aspect of the embodiments described herein, a computer-implemented method of operating at least one cargo area door of a vehicle is provided. The at least one cargo area door is configured to be movable to enable physical access to an associated cargo area of the vehicle, and also movable to block physical access to the associated cargo area. The vehicle also includes an unlocking mechanism configured to, responsive to one or more control commands, autonomously unlock the at least one cargo area door. The method includes steps of determining if the vehicle currently resides at a selected destination and, responsive to a determination that the vehicle currently resides at the selected destination, operating the unlocking mechanism to unlock the at least one cargo area door.

In another aspect of the embodiments described herein, a vehicle cargo area door control system is provided for controlling autonomous operation of at least one vehicle cargo area door. The system includes one or more processors and a memory communicably coupled to the one or more processors and storing a cargo area door control module including instructions that when executed by the one or more processors cause the one or more processors to control at least one of unlocking, opening, closing, and locking of at least one vehicle cargo area door in accordance with one or more pre-selected cargo area operation control settings. Each cargo area operation control setting is associated with at least one condition under which a cargo area door is to be unlocked, opened, closed, and/or locked.

BRIEF DESCRIPTION OF THE DRAWINGS

The accompanying drawings, which are incorporated in and constitute a part of this specification, illustrate embodiments described herein and together with the description serve to explain principles of embodiments described herein.

FIGS. 3A-3C in combination show a flow diagram illustrating the autonomous implementation of operations to control the unlocking and opening of a vehicle cargo area door after transportation of a vehicle occupant and/or cargo to a selected destination.

FIGS. 4A-4C in combination show a flow diagram illustrating the autonomous implementation of operations to aid in preventing a vehicle occupant from forgetting or leaving cargo in a vehicle cargo area after the occupant has exited the vehicle.

DETAILED DESCRIPTION

Embodiments described herein relate to a cargo area door control system for a vehicle. The vehicle includes at least one cargo area and at least one cargo area door configured to be movable to enable physical access to the at least one cargo area, and movable to block physical access to the at least one cargo area. The control system includes one or more processors and a memory communicably coupled to the one or more processors. The memory stores a cargo area door control module including instructions that when executed by the one or more processors cause the one or more processors to determine if the vehicle currently resides at a selected destination and, responsive to a determination that the vehicle currently resides at the selected destination, operate a cargo area door unlocking mechanism to autonomously unlock the at least one cargo area door. Other cargo area door control operations (such as opening, closing, and/or locking the cargo area door) may also be autonomously performed responsive to the occurrence of various conditions. A user may select various conditions under which cargo area doors of cargo areas containing cargo may be autonomously unlocked, opened, closed, and/or locked. Alternatively, selection of the conditions under which cargo area doors of cargo areas containing cargo may be autonomously unlocked, opened, closed, and/or locked may be performed by a computing system, or by a computing system in conjunction with a human user.

Under a particular cargo area operation control setting, one or more cargo area doors may be controlled by explicit commands from a remote entity, such as a human or computing system at a remote facility or otherwise spaced apart from the vehicle. For example, a command signal to close and/or lock a cargo area door may be sent from the remote entity to the vehicle via communications interface(s)

located in the vehicle. In one operational mode, the communications interface(s) may be operably coupled to actuator(s) configured to implement the commands received at the communications interface(s). In another operational mode, the command signal may be received by vehicle communications interface(s) and relayed to a cargo area door control module, which then generates a door control command appropriate for execution by the actuators. In another operational mode, the command signal may be received by vehicle communications interface(s) and relayed to a cargo area door control module, which then relays the received command signal to the actuators without further modification or manipulation of the received signal.

The patent application relating to U.S. Ser. No. 16/503,743 (also entitled "AUTONOMOUS CONTROL OF VEHICLE CARGO AREA DOORS") is being filed on the same day as this patent application.

Figure 1:
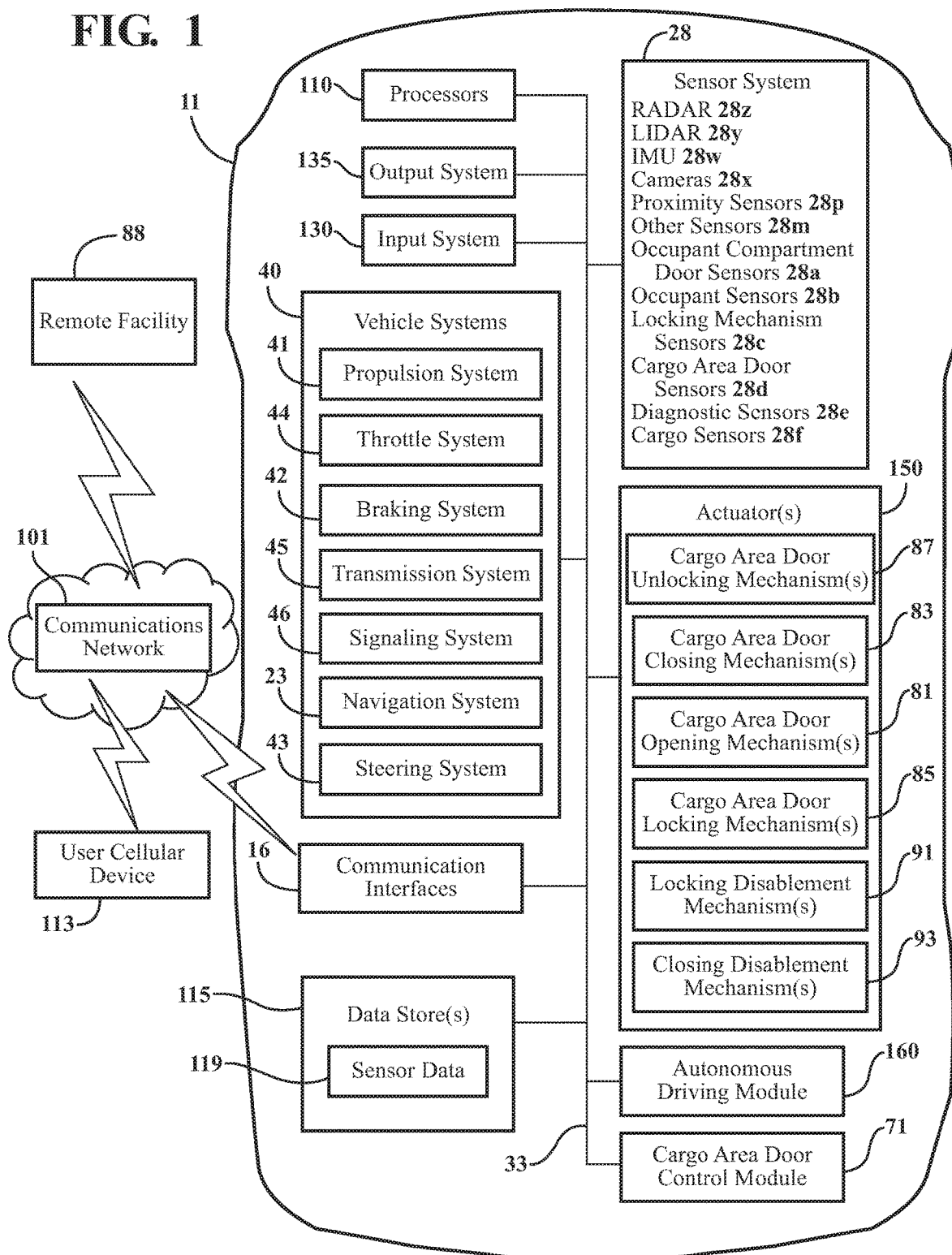
FIG. 1 is a schematic block diagram of a vehicle incorporating a system configured for autonomously controlling operation of one or more vehicle cargo area doors, which control physical access to one or more associated vehicle cargo areas usable for storing and/or transporting cargo.

FIG. 1 is a schematic block diagram of a vehicle 11 incorporating a vehicle cargo area door control system configured for autonomously controlling operation of one or more vehicle cargo area doors. As used herein, a "vehicle" is any form of motorized transport. In one or more implementations, the vehicle 11 is an automobile. While arrangements will be described herein with respect to automobiles, it will be understood that embodiments are not limited to automobiles. In some implementations, the vehicle 11 may be any robotic device or form of motorized transport that, for example, includes sensors to perceive aspects of the surrounding environment, and thus benefits from the functionality discussed herein. The vehicle 11 may take the form of a car, truck, or any other vehicle incorporating one or more vehicle cargo areas usable for holding and transporting items of cargo.

The vehicle 11 may be configured for autonomous operation, and may operate in a fully or partially autonomous mode. In some instances, the vehicle 11 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a vehicle occupant (e.g., a human driver). In one or more arrangements, the vehicle 11 can be a conventional vehicle that is configured to operate in a manual mode while including the capability of performing one or more of the cargo area door control functions described herein.

In one or more embodiments, the vehicle 11 is an autonomous vehicle. As used herein, "autonomous vehicle" refers to a vehicle that operates in an autonomous mode. "Autonomous mode" refers to navigating and/or maneuvering the vehicle 11 along a travel route using one or more computing systems to control the vehicle 11 with minimal or no input from a human driver. In one or more embodiments, the vehicle 11 is highly automated or completely automated. In one embodiment, the vehicle 11 is configured with one or more semi-autonomous operational modes in which one or more computing systems perform a portion of the navigation and/or maneuvering of the vehicle along a travel route, and a vehicle operator (e.g., a vehicle occupant or a remote operator) provides inputs to the vehicle to perform a portion of the navigation and/or maneuvering of the vehicle 11 along a travel route.

In one or more embodiments, the vehicle 11 is a remotely controlled vehicle. As used herein, a "remotely controlled vehicle" refers to a vehicle that operates in a remote operational mode. "Remote operational mode" refers to navigating and/or maneuvering the vehicle 11 along a travel route by an operator located remotely from the vehicle, for example at a remote facility (such as remote facility 88 shown in FIG. 1). For example, the remote operator may observe and control any or all aspects of vehicle operation from a remote terminal located at the remote facility or at another location. A "remote entity" may be an entity located exterior of and spaced apart from the vehicle. Non-exclusive examples of remote entities may include remote facility 88, a remote human operator, and a remote computing system.

The vehicle 11 includes various elements. It will be understood that in various embodiments it may not be necessary for the vehicle 11 to have all of the elements shown in FIG. 1. The vehicle 11 can have any combination of the various elements shown in FIG. 1. Further, the vehicle 11 can have additional elements to those shown in FIG. 1. In some arrangements, the vehicle 11 may be implemented without one or more of the elements shown in FIG. 1. While the various elements are shown as being located within the vehicle 11 in FIG. 1, it will be understood that one or more of these elements can be located external to the vehicle 11. Further, the elements shown may be physically separated by large distances.

Some of the possible elements of the vehicle 11 are shown in FIG. 1 and will be described along with subsequent figures. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

The vehicle 11 can include one or more processor(s) 110. "Processor" means any component or group of components that are configured to execute any of the processes and/or process steps described herein, or any form of instructions to carry out such processes/process steps or cause such processes/process steps to be performed. In one or more arrangements, the processor(s) 110 can be a main processor of the vehicle 11. For instance, the processor(s) 110 can be an electronic control unit (ECU). The processor(s) may also form part of a computing system for the vehicle 11. Processor(s) 110 may execute instructions stored in a non-transitory computer readable storage medium, such as data store(s) 115 or another memory communicably coupled to the one or more processor(s) 110. The processor(s) 110 may be operatively connected to the other vehicle systems and elements and otherwise configured so as to affect partial or fully autonomous control and operation of the vehicle 11 and its components as described herein. The processor(s) 110 may control the functioning of the vehicle 11 based on inputs and/or information received from any of communication interfaces 16, sensor system 28, vehicle input system 130, and/or from any other suitable source of information. The processor(s) 110 can include at least one hardware circuit (e.g., an integrated circuit) configured to carry out instructions contained in program code. The processor(s) 110 may be implemented with one or more general-purpose and/or one or more special-purpose processors. Examples of suitable processors include microprocessors, controllers, microcontrollers, DSP processors, and other circuitry that can execute software. In arrangements in which there is a plurality of processors 110, such processors can work independently from each other or one or more processors can work in combination with each other.

The vehicle 11 can include one or more data store(s) 115 for storing one or more types of data. The data store(s) 115 may comprise one or more computer-readable memories. A computer-readable memory may include any medium that participates in providing data (e.g., instructions), which may be read by a computer. The data store(s) 115 can include volatile and/or non-volatile memory. Examples of suitable data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

The one or more data store(s) 115 can include sensor data 119. In this context, "sensor data" means any information about any sensors that the vehicle 11 is equipped with, including the capabilities and other information about such sensors. As will be explained below, the vehicle 11 can include the sensor system 28. The sensor data 119 can relate to one or more sensors of the sensor system 28. As an example, in one or more arrangements, the sensor data 119 can include information on one or more LIDAR sensors 28$y$ of the sensor system 28. In some instances, at least a portion of the sensor data 119 can be located in one or more data store(s) 115 located onboard the vehicle 11. Alternatively, or in addition, at least a portion of the sensor data 119 can be located in one or more data store(s) 115 that are located remotely from the vehicle 11. Data store(s) 115 may store data such as roadway maps and path information, among other information. Such information may be used by the navigation system 23 in calculating and evaluating various routes that may be autonomously driven by the vehicle 11.

The vehicle 11 can include one or more vehicle systems 40. Various examples of the one or more vehicle systems 40 are shown in FIG. 1. However, the vehicle 11 can include more, fewer, or different vehicle systems. It should be appreciated that although particular vehicle systems are separately defined, each or any of the systems or portions thereof may be otherwise combined or segregated via hardware and/or software within the vehicle 11. The vehicle 11 can include a propulsion system 41, a braking system 42, a steering system 43, throttle system 44, a transmission system 45, a signaling system 46, and/or a navigation system 23. Each of these systems can include one or more devices, components, and/or a combination thereof, now known or later developed.

The vehicle 11 can include an input system 130. An "input system" includes any device, component, system, element or arrangement or groups thereof that enable information/data to be communicated to a machine. The input system 130 can receive input from a human operator in the vehicle (e.g., a driver, passenger) or from a human operator (e.g., a vehicle scheduler) or computing system (located, for example, at a remote facility 88) configured for exercising at least partial control of the vehicle 11.

The vehicle 11 can include an output system 135. An "output system" includes any device, component, or arrangement or groups thereof that enable information/data to be presented to a human operator (while either inside or outside the vehicle 11) or conveyed to a human operator or a computing system at a remote facility (such as remote facility 88).

For example, input/output systems 130/135 may include a human-machine interface ("HMI") (not shown) including elements located in the occupant compartment and hard-wired to the vehicle processor(s) and/or other vehicle systems. The HMI may include elements such as a display, keypad, microphones and speakers for voice-recognition and user communication with the vehicle 11. The input/output systems 130/135 may also (or alternatively) include hardware and software elements enabling communications between vehicle 11 and a user using a cellular phone or other personal communications device 113. The input/output systems 130/135 may be in any form and incorporate any elements and/or systems directed to facilitating communications between the vehicle 11 and a user and/or a remote facility 88 which controls one or more operations of the vehicle.

The vehicle 11 can include one or more actuator(s) 150. The actuator(s) 150 can be any element, combination of elements, or mechanisms operable to modify, adjust and/or alter one or more of the vehicle systems 40 or components thereof to responsive to receiving signals or other inputs from the processor(s) 110, the autonomous driving module(s) 160, and/or the cargo area door control module 71 (all described in greater detail below). Any suitable actuator(s) can be used. For instance, the one or more actuator(s) 150 can include motors, pneumatic actuators, hydraulic pistons, relays, solenoids, and/or piezoelectric actuators, just to name a few possibilities. Some examples of specific actuators which may be incorporated into and/or controlled by an embodiment of the cargo area door control system will be described below. However, additional actuators may also be employed in the vehicle for purposes other than those described. Some examples of specific actuators which may be incorporated into and/or controlled by an embodiment of the cargo area door control system include cargo area door unlocking mechanism(s) 87, cargo area door opening mechanism(s) 81, cargo area door closing mechanism(s) 83, cargo area door locking mechanism(s) 85, locking disablement mechanism(s) 91, and closing disablement mechanism(s) 93 as described in greater detail below.

In one or more particular arrangements, one or more of actuators 150 may be configured to operate on elements of the vehicle responsive to commands received directly from a remote entity (i.e., a source exterior of and spaced apart from the vehicle) via a communications interface (such as communications interfaces 16) operably coupled to the one or more actuators. For example, one or more of cargo area door unlocking mechanisms 87 may be configured to operate to unlock one or more associated cargo area doors responsive to a command received by the cargo area door unlocking mechanism(s) directly from the remote entity to unlock the cargo area doors. One or more of cargo area door opening mechanisms 81 may be configured to operate to open one or more associated cargo area doors responsive to a command received by the cargo area door opening mechanism(s) directly from the remote entity to open the cargo area doors. One or more of cargo area door closing mechanisms 83 may be configured to operate to close one or more associated cargo area doors responsive to a command received by the cargo area door closing mechanism(s) directly from the remote entity to close the cargo area doors. One or more of cargo area door locking mechanisms 85 may be configured to operate to lock one or more associated cargo area doors responsive to a command received by the cargo area door locking mechanism(s) directly from the remote entity to lock the cargo area doors. Thus, for example, in actuators configured to operate on cargo area door-related actuators responsive to commands sent from a remote entity directly to the actuator(s) via the communications interfaces 16, the command from the remote entity need not necessarily be routed through the cargo area door control module 71.

In one or more arrangements, the communications interface(s) through which the cargo area door operating command(s) may be received are separate from the one or more actuators. In other arrangements, communications interface(s) through which the cargo area door operating command(s) may be received are incorporated into the actuator(s) themselves (for example, to minimize time delay and/or to help minimize risk of possible signal corruption and/or interruption.

A vehicle cargo area may be any enclosure or volume of space in which cargo (such as luggage, packages and/or other items) may be positioned in the vehicle for travel, and which may be securable to prevent access to contents therein without permission or authorization. For example, an owner of cargo, a person responsible for transporting the cargo, or an operator or owner of the vehicle may have authorization to access the cargo when it is stowed in a cargo area. Non-exclusive examples of vehicle cargo areas may include a vehicle trunk, a rear area of a sport utility vehicle (SUV) hatchback, and a lockable compartment located within a vehicle occupant compartment.

A cargo area door may be any door, panel, or other structure which is movable and/or securable to enable or prevent physical access to a vehicle cargo area. Non-exclusive examples of cargo area doors may include a vehicle trunk door, a hatchback door on a sport utility vehicle, a tonneau cover mounted on a pickup truck, and a tailgate on a pickup truck.

In one or more arrangements, each cargo area door may be provided with an associated cargo area door unlocking mechanism (generally designated 87) configured to unlock the cargo area door responsive to command(s) from the cargo area door control module 71. A cargo area door may be considered to be "unlocked" when a locking mechanism configured to lock the door is in a condition in which the locking mechanism does not prevent the door from being opened. A locking mechanism may be considered to be "unlocked" when the mechanism is in a condition in which it would not prevent a cargo area door associated with the mechanism from being opened. The type and configuration of the unlocking mechanism 87 used may depend on such factors as the locking mechanism design associated with the cargo area door, and other pertinent factors. In one or more arrangements, the unlocking function may be implemented by the same mechanism which performs the locking function. In other arrangements, the unlocking function may be performed by an unlocking mechanism which is different from the locking mechanism, or which includes elements different from (as well as elements common to) those included in the locking mechanism. Any cargo area door unlocking mechanism 87 may incorporate any elements and/or mechanism(s) suitable for unlocking an associated cargo area door, and for enabling operation of the unlocking mechanism 87 by the cargo area door control module 71 as described herein.

In one or more arrangements, each cargo area door may be provided with an associated cargo area door opening mechanism (generally designated 81) configured to open the cargo area door responsive to commands from the cargo area door control module 71. A cargo area or a cargo area door for the cargo area may be considered to be "open" the cargo area door is positioned or oriented so as to allow physical access to the cargo area, thereby enabling cargo to be deposited in the cargo area or removed from the cargo area, or when the cargo area door is not in a position so as to be lockable by an associated door locking mechanism.

The type and configuration of the cargo area door opening mechanism 81 used may depend on such factors as the space available for the cargo area door opening mechanism and other pertinent factors. In one or more arrangements, the cargo area door opening function may be implemented by the same mechanism which performs the door closing function. In other arrangements, the door opening function may be performed by an opening mechanism which is different from the closing mechanism, or which includes elements different from (as well as elements common to) those included in the closing mechanism. Any cargo area door opening mechanism 81 may incorporate any elements and/or mechanism(s) suitable for opening an associated cargo area door, and for enabling operation of the cargo area door opening mechanism by the vehicle cargo area door control module 71 as described herein.

In one or more arrangements, each cargo area door may be provided with an associated cargo area door closing mechanism (generally designated 83) configured to close the cargo area door responsive to commands from the cargo area door control module 71. A cargo area or a cargo area door for the cargo area may be considered to be "closed" when the cargo area door is positioned or oriented so as to enable a locking mechanism associated with the cargo area door to be engaged to lock the cargo area door.

The type and configuration of the closing mechanism 83 used may depend on such factors as the space available for the closing mechanism and other pertinent factors. In one example, the cargo area door closing mechanism 83 may be in the form of one or more hydraulic or pneumatic cylinders configured to be actuatable by computer control commands. In another example, the closing mechanism 83 may be a gear train or other motion transfer mechanism which is operatively coupled to a motor and to an associated cargo area door. Any cargo area door closing mechanism 83 may incorporate any elements and/or mechanism(s) suitable for closing an associated cargo area door, and for enabling operation of the closing mechanism 83 by the vehicle cargo area door control module 71 as described herein.

In one or more arrangements, each cargo area door may be provided with an associated cargo area door locking mechanism (generally designated 85) configured to lock the cargo area door responsive to commands from the cargo area door control module 71. A cargo area door may be considered to be "locked" when a locking mechanism configured to lock the door is in a condition in which the mechanism prevents the door from being opened. A locking mechanism 85 may be considered to be "locked" when the mechanism is in a condition in which it would prevent a cargo area door associated with the mechanism from being opened. The type and configuration of the locking mechanism 85 used may depend on such factors as the cargo area door design, the location of the door, and other pertinent factors. For example, for the trunk of a vehicle, the cargo area door locking mechanism may be similar to any of a variety of existing automatic trunk locks. Any cargo area door locking mechanism 85 may incorporate any elements and/or mechanism(s) suitable for locking an associated cargo area door, and for enabling operation of the locking mechanism 85 by the vehicle cargo area door control module 71 as described herein.

In one or more arrangements, a locking disablement mechanism (generally designated 91) may be configured to implement a cargo area door locking disablement function responsive to a command from cargo area door control module 71. In particular arrangements, a locking disablement mechanism may be operatively coupled to a door locking mechanism or incorporated into a door locking mechanism. The locking disablement mechanism may be actuated separately from an unlocking mechanism associated with the cargo area door. The locking disablement function and locking disablement mechanism may be configured to enable the locking mechanism to be disabled to unlock the cargo area door if the unlocking mechanism fails to unlock the door responsive to an "unlock" control command from the cargo area door control module 71. This helps ensure that the cargo area door may be unlocked for access to the cargo even if the unlocking mechanism fails to unlock the cargo area door on command. One example of a locking disablement mechanism may be in the form of an electromagnet which is operable by the cargo area door control module 71 to magnetically retract a latch of a locking mechanism 85 holding a cargo area door in a locked condition. Retraction of the latch may unlock the door, enabling the door to be opened.

A mechanism described herein as being disabled need not be damaged or permanently disabled. "Disable" for the purposes described herein may refer to deactivation of the normal function performed by the mechanism so that the cargo area door may be manipulated manually or by a secondary control (for example, a manual release lever for a trunk door).

In one or more arrangements, a locking disablement mechanism 91 may be combined with an unlocking mechanism 87 and a locking mechanism 85 into a single mechanism capable of performing all of these functions. Alternatively, the disablement mechanism 91 may be separate from (and separately actuatable from) the locking and/or unlocking mechanisms. Any cargo area door locking disablement mechanism 91 may incorporate any elements and/or mechanism(s) suitable for disabling a locking mechanism of an associated cargo area door, and for facilitating operation of the locking disablement mechanism by the cargo area door control module 71 as described herein.

In one or more arrangements, a closing disablement mechanism (generally designated 93) may be configured to implement a cargo area door closing disablement function responsive to a command from cargo area door control module 71. In particular arrangements, a dedicated closing disablement mechanism 93 may be operatively coupled to a door closing mechanism 83 or incorporated into the door closing mechanism. The closing disablement mechanism 93 may be actuatable separately from a door closing mechanism 83 and/or a door opening mechanism 81 associated with the cargo area door. The closing disablement function and closing disablement mechanism 93 may be configured to enable the door closing mechanism 83 to be disabled, so that the cargo area door can be opened if the door opening mechanism 81 fails to open the door responsive to an "open" command. This helps ensure that the cargo area door may be opened for access to the cargo even if the door opening mechanism fails to open the cargo area door on command.

In one example of a closing disablement mechanism 93, in an opening/closing mechanism which operates computer system-controlled hydraulic cylinders to open and close the cargo area door, the closing disablement mechanism 93 may include one or more valves configured to depressurize a portion of the hydraulic system so that the cargo area door may be freely opened and closed by a human user with little resistance. Any cargo area door closing disablement mechanism may incorporate any elements and/or mechanism(s) suitable for disabling a closing mechanism of an associated cargo area door, and for facilitating operation of the closing disablement mechanism by the cargo area door control module 71 as described herein.

Figure 2:
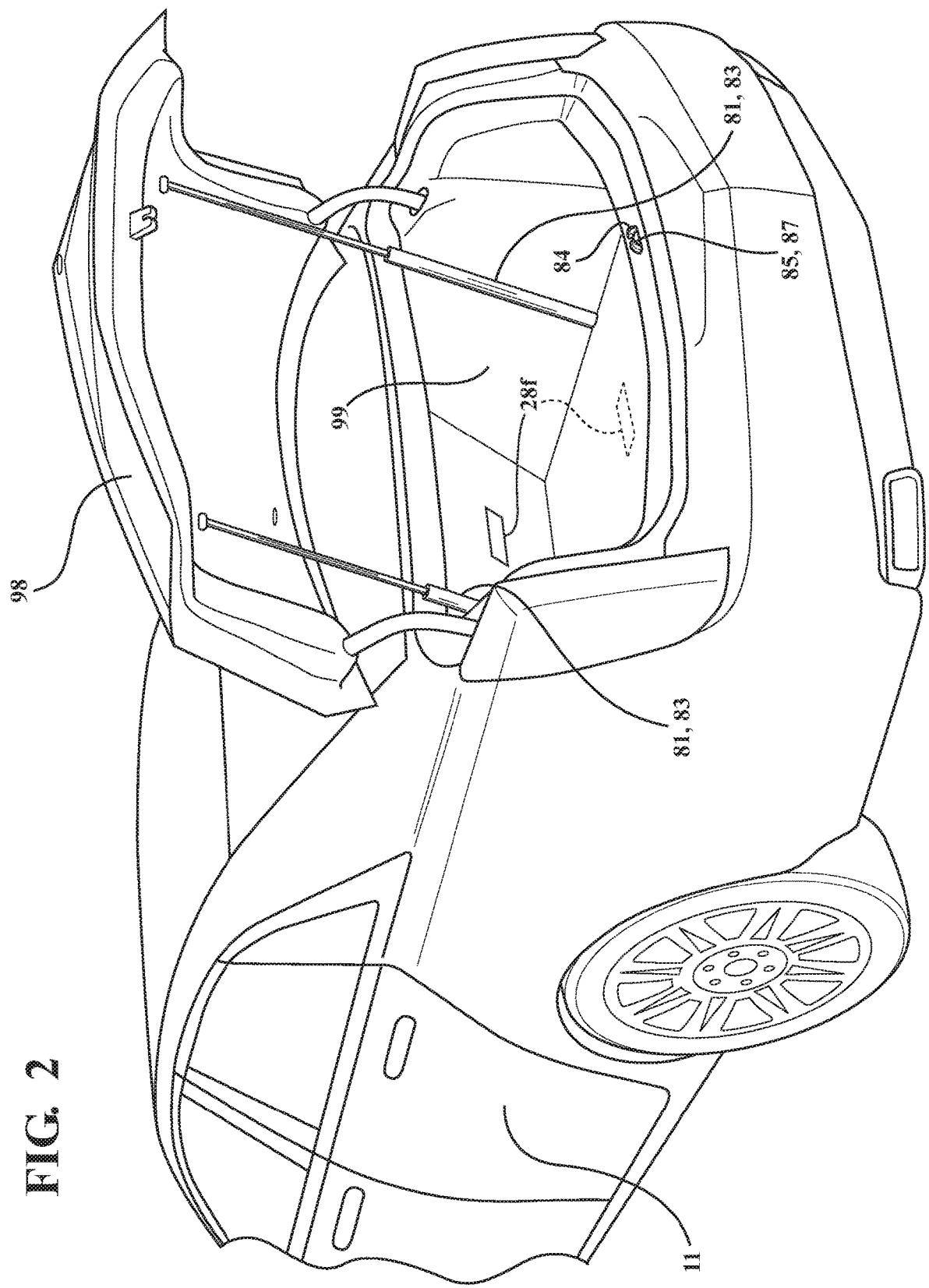
FIG. 2 is a schematic perspective rear view of a particular embodiment of a vehicle configured as shown in FIG. 1, showing one example of a cargo area in the form of a vehicle trunk and a cargo area door in the form of a trunk lid.

FIG. 2 is a schematic perspective rear view of one example of the vehicle 11 showing a cargo area in the form of a vehicle trunk 99 and a cargo area door 98 in the form of a trunk lid. The vehicle 11 is provided with cargo area door opening and closing mechanisms 81/83 as previously described, in the form of one or more hydraulic cylinders which are operable to perform both the door opening and closing functions. The door opening mechanism 81 may include hydraulic system elements which are used only in performance of the door opening function, and the door closing mechanism 83 may include hydraulic system elements which are used only in performance of the door closing function. Each of mechanisms 81 and 83 may also include elements common to the other one of mechanisms 81 and 83. Alternatively, mechanisms 81 and 83 may use all the same hydraulic system elements.

The vehicle 11 of FIG. 2 is also provided with locking and unlocking mechanisms 85/87 as previously described operable to lock and unlock the cargo area door when the door is in a closed configuration. The door locking mechanism 85 may include elements which are used only in performance of the door locking function, and the door unlocking mechanism 87 may include elements which are used only in performance of the door unlocking function. Each of mechanisms 85 and 87 may also include elements common to the other one of mechanisms 85 and 87. Alternatively, mechanisms 85 and 87 may use all the same elements.

The vehicle 11 may also be also provided with a locking disablement mechanism 91 as previously described, which is designed to disable the locking mechanism if the cargo area door fails to unlock on command. The locking disablement mechanism 91 may include elements which are used only in performance of the locking disablement function. The locking disablement mechanism 91 may also include elements common to one or more of the locking mechanism 85 and the unlocking mechanism 87.

The vehicle 11 can include one or more modules, at least some of which are described herein. The modules can be implemented as computer-readable program code that, when executed by processor(s) 110, implement one or more of the various control commands and/or processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more of data store(s) 115 may contain such instructions. A module may also be implemented as a combination of one or more processors configured for controlling operation or one or more vehicle components or systems, and a memory communicably coupled to the one or more processors for storing data and program instructions executable by the one or more processors. Execution of the instructions by the one or more processors may control operations of various aspects of the vehicle, including operation of the cargo area doors as described herein.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Although specific modules will be described herein, it is understood that additional controls, systems and/or modules may be included if needed to perform the functions described herein, depending on the design of a particular vehicle. Vehicle embodiments described herein are assumed to include sufficient systems and/or elements to autonomously execute all of the commands needed to perform the various cargo area door control operations described herein.

Referring again to FIG. 1, the vehicle 11 can include one or more autonomous driving modules 160. The autonomous driving module(s) 160 can be configured to receive data from the sensor system 28 and/or any other type of system capable of capturing information relating to the vehicle 11 and/or the external environment of the vehicle 11. The vehicle 11 may be configured for completely autonomous driving operations (i.e., for self-driving, without the presence of a driver or driver input) from a start location to a given destination under control of the autonomous driving module(s) 160.

The autonomous driving module(s) 160 can determine position and velocity of the vehicle 11. Using information from sensor system 28 and/or other information, the autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 11 for use by the processor(s) 110, and/or one or more of the modules described herein to estimate position and orientation of the vehicle 11, vehicle position in global coordinates based on signals from a plurality of satellites, or any other data and/or signals that could be used to determine the current state of the vehicle 11 or determine the position of the vehicle 11 with respect to its environment for use in either creating a map or determining the position of the vehicle 11 in respect to map data.

The cargo area door control module 71 may be configured to control aspects of cargo area door operations in accordance with preferences pre-selected by a user and/or a computing system, and also in accordance with pre-programmed default procedures not necessarily defined or selected by a user and/or computing system. In one or more arrangements, all of the cargo area door-related control functions described herein as being performed by the cargo area door control module 71 may be performed by the cargo area door control module 71 acting in combination with other elements of vehicle 11, where necessary.

Aspects of cargo area door operations which may be controlled by the cargo area door control module 71 include door opening, door closing, door locking, door unlocking, and disablement of door closing and locking functions. Other cargo area door operations may also be controlled and performed by the cargo area door control module 71. The cargo area door control module 71 may be implemented in the form of hardware, software, or any suitable combination of hardware and software.

The cargo area door control module 71 may optionally be configured to control operation of one or more of the other vehicle systems so as to prevent motion of the vehicle when a cargo area door is open and/or unlocked. This control of vehicle motion may be responsive to, for example, information provided by cargo area door-related sensors indicating that one or more cargo area doors are open and/or unlocked, and responsive to a command or instruction which would cause the vehicle to start moving with the cargo area door(s) is open and/or unlocked.

In one or more arrangements, the cargo area door control module 71 may be configured to provide a cargo area door autonomous command interrupt function enabling a user and/or computing system to interrupt or discontinue a previously selected cargo area door control function. Selection of the interrupt by a user and/or computing system may disable autonomous operation of the selected control function until it (or another autonomous control function) is selected by the user and/or a computing system. For example, a user may de-select a previously selected autonomous operation directed to unlocking a cargo area door when an occupant exits the vehicle. As used herein, the terms "occupant" and "vehicle occupant" may refer to either a person who is currently inside the vehicle occupant compartment, or a person who was inside the occupant compartment but has exited the occupant compartment after arriving at a selected destination. Then the cargo area door control module 71 would cease autonomously controlling the cargo area door in accordance with the de-selected autonomous control operation until this (or another) control mode was selected by a user or other entity (such as a remote computing system or remotely-located human operator). Deactivation or de-selection of one control mode in the manner described may not affect other active autonomous control modes.

In one or more arrangements, the cargo area door control module 71 may also be configured to generate one or more alert message(s) indicating that a cargo area door is open, despite the fact that a control command directed to closing the cargo area door was generated. The cargo area door control module 71 may also be configured to generate one or more alert message(s) indicating that a cargo area door is closed, despite the fact that a control command directed to opening the cargo area door was generated. The cargo area door control module 71 may also be configured to generate one or more alert message(s) indicating that a cargo area door is locked, despite the fact that a control command directed to unlocking the cargo area door was generated. The cargo area door control module 71 may also be configured to generate one or more alert message(s) indicating that a cargo area door is unlocked, despite the fact that a control command directed to locking the cargo area door was generated. Any alert message(s) described herein may be transmitted to any receiving entity (for example, to a user, to a computing device, or to another receiving entity (such as a computing system or human operator at a remote facility)) using any suitable method (for example, via the vehicle communication interfaces 16, a vehicle HMI, a cellular device of a vehicle occupant, a remote vehicle operations or remote facility 88, or by any other suitable method).

In one or more arrangements, one or more of processor(s) 110 and/or cargo area door control module 71 may be configured to execute instructions to perform diagnostic procedures directed to determining why a cargo area door control command was not performed. For example, if a cargo area door fails to unlock, open, close, and/or lock responsive to a cargo area door control module control command, the processor(s) 110 and/or cargo area door control module 71 may perform diagnostic routines directed to determining why the instruction was not executed. The processor(s) 110 and/or cargo area door control module 71 may use any of the vehicle sensors to gather information pertinent to the performance of the diagnostic. The sensors used may be sensors usable for other purposes on the vehicle, or the sensors may be sensors dedicated to aiding in performance of the diagnostics.

A cargo area door control command may fail because a pertinent control element is physically incapable of performing the command, or for other reasons (for example, safety). In one example, a command to open a trunk door may fail because a heavy object is resting on top of the trunk lid, thereby preventing the door opening mechanism from opening the door. In another example, a sensor configured to detect objects behind the vehicle may be configured to detect the presence of a person in close proximity to the trunk door, in which case the trunk door may be prevented from opening due to the possibility of the door contacting the person during opening. Multi-purpose and/or dedicated diagnostic sensors 28e such as cameras, weight sensors, proximity sensors, and any other suitable types of sensors may be incorporated into the vehicle 11 and used for diagnostic purposes. Sensors used for other purposes in the vehicle may also be used for diagnostic purposes.

As described herein, the processor(s) 110 and/or the cargo area door control module 71 may be configured to enable user, computer and/or remote selection of one or more cargo area doors (for example, trunk, occupant compartment storage, etc.) that will be autonomously controlled, the control commands or operations (for example, open, close, lock, unlock) which will be performed on the door, and the conditions (for example, when an occupant exits the vehicle) under which any given control operation will be performed. The computing system selecting the one or more doors and an associated cargo area door control mode may be onboard the vehicle or the computing system may be located remotely from the vehicle (such as in a mobile/cellular device 113 of a user, or at a remote facility such as remote facility 88 (FIG. 1)).

The vehicle 11 can include the sensor system 28. "Sensor" means any device, component and/or system that can detect, and/or sense something. The one or more sensors can be configured to detect, and/or sense in real-time. As used herein, the term "real-time" means a level of processing responsiveness that a user or computing system senses as sufficiently immediate for a particular process or determination to be made, or that enables the processor to keep up with some external process.

In arrangements in which the sensor system 28 includes a plurality of sensors, the sensors can work independently from each other. Alternatively, two or more of the sensors can work in combination with each other. In such case, the two or more sensors can form a sensor network. The sensor system 28 and/or the one or more sensors can be operatively connected to the processor(s) 110, the data store(s) 115, and/or another element of the vehicle 11 (including any of the elements shown in FIG. 1). The sensor system 28 can acquire data of at least a portion of the external environment of the vehicle 11 (e.g., nearby vehicles).

Sensors of the sensor system 28 can be operatively connected to the processor(s) 110 or any other element of the vehicle 11. In a known manner, the vehicle sensors may provide data usable by the vehicle control systems (such as the autonomous driving module 160 and the cargo area door control module 71) in formulating and executing suitable control commands to the various vehicle systems. For example, data from inertial sensors, wheel speed sensors, road condition sensors, and steering angle sensors may be processed by the autonomous driving module 160 in formulating and executing a command in steering system 43 to turn the vehicle.

The sensor system 28 can include any suitable type of sensor. Various examples of different types of sensors will be described herein. However, it will be understood that the embodiments are not limited to the particular sensors described.

The sensor system 28 can include one or more sensors designed to monitor various vehicle operational status parameters and environmental conditions external to the vehicle. For example, the sensor system 28 can include one or more configured to acquire, and/or sense driving environment data. "Driving environment data" includes data or information about the external environment which an autonomous vehicle is located or one or more portions thereof. For example, the one or more of sensors 28 can be configured to detect, quantify and/or sense obstacles in at least a portion of the external environment of the vehicle 11 and/or information/data about such obstacles. Such obstacles may be stationary objects and/or dynamic objects. One or more of sensors 28 can be configured to detect, measure, quantify and/or sense other things in the external environment of the vehicle 11, such as, for example, lane markers, signs, traffic lights, traffic signs, lane lines, crosswalks, curbs proximate the vehicle 11, off-road objects, other vehicles, traffic levels, road conditions, traffic, animals, cyclists, pedestrians, etc., either moving or stationary, which are within a certain distance of vehicle 11. Sensors 28 may detect and store information relating to external driving conditions, external temperature, rain, snow, light levels, and sun position for driver visibility.

As an example, in one or more arrangements, the sensor system 28 can include RADAR sensors 28z, proximity sensors 28p, laser rangefinder/LIDAR sensors 28y, and other sensors 28m for various purposes. One or more vehicle cameras (generally designated 28x) may include devices configured to capture a plurality of images of the interior of the vehicle and/or an external environment of the vehicle 11, and may be usable to determine the route, lane position, and other vehicle position/location data. The camera(s) may be still cameras or video cameras. In one or more arrangements, the one or more cameras 28x can be high dynamic range (HDR) cameras or infrared (IR) cameras.

The sensor system 28 can include one or more vehicle sensors configured to detect, determine, and/or sense information about the vehicle 11 itself. In one or more arrangements, the vehicle sensor(s) can be configured to detect, and/or sense position and orientation changes of the vehicle 11, such as, for example, based on inertial acceleration. In one or more arrangements, the vehicle sensor(s) can include one or more accelerometers, one or more gyroscopes, an inertial measurement unit (IMU) 28w, a dead-reckoning system, a global navigation satellite system (GNSS), a global positioning system (GPS), navigation system 23, and/or other suitable sensors. The vehicle sensor(s) can be configured to detect, and/or sense one or more characteristics of the vehicle 11. In one or more arrangements, the vehicle sensor(s) can include a speedometer to determine a current speed of the vehicle 11. In another example, the IMU 28w may incorporate any combination of sensors (e.g., accelerometers and gyroscopes) configured to sense position and orientation changes of the vehicle 11 based on inertial acceleration. The IMU 28w may sense such parameters as vehicle roll rate, yaw rate, pitch rate, longitudinal acceleration, lateral acceleration, and vertical acceleration.

Any data collected by vehicle sensors 28 may also be transmitted to any vehicle system or component requiring or utilizing the data for the purposes described herein. The data collected by vehicle sensors 28 may be stored and/or analyzed within the vehicle and/or may be transmitted to one or more external devices. For example, the sensor data may be transmitted via telematics devices to one or more remote computing systems, such as a mobile device 113 or remote facility 88 as described herein.

Sensor system 28 may also include one or more occupant compartment door sensors (generally designated 28a). A vehicle occupant compartment may be any compartment or volume of space within the vehicle in which vehicle occupants may travel during normal operation of the vehicle. The occupant compartment may include a driver space and one or more passenger spaces in front, back and/or any intermediate seats. The occupant compartment may include openings through which vehicle occupants may enter or exit the vehicle in a known manner. Each occupant compartment opening may have a door associated therewith, to enable the occupant compartment to be opened or closed in a conventional manner.

In one or more arrangements, an occupant compartment door sensor 28a may be positioned in operative association with each occupant compartment doorway through which a vehicle occupant may pass in entering or exiting the vehicle 11. The occupant compartment door sensor(s) 28a may be configured to generate a "door open" signal to the cargo area door control module 71 as soon as any of the occupant compartment doors are opened. In particular arrangements, the occupant compartment door sensor(s) 28a may be configured to generate a "door open" signal to the cargo area door control module 71 as soon as any of the occupant compartment doors are opened by at least a predetermined amount (for example, an amount sufficient to allow a vehicle occupant to pass through the door opening to the vehicle exterior). This signal may be discontinued when the door is closed. In this manner, an "open" or "closed" status of each door of the occupant compartment may be continuously monitored. Any suitable type of sensor may be used for these purposes, for example, conventional contact sensors.

Sensor system 28 may include one or more vehicle occupant sensors (generally designated 28b). Each vehicle occupant sensor 28b may be configured to generate a signal to the cargo area door control module 71 when a vehicle occupant exits the vehicle through a vehicle occupant compartment doorway. In one or more arrangements, vehicle occupant sensor(s) 28b may also be configured to detect the number of occupants in the vehicle and/or various characteristics of any vehicle occupants, such as size, weight, etc. Any suitable type of sensor may be used for these purposes, for example, conventional proximity sensors or LIDAR sensors. Occupant sensor(s) 28b may also be configured to detect and track the movements of occupants who have left the vehicle, including the positions of these persons relative to the vehicle, the distances of these persons from the vehicle, and various other parameters relating to such persons. Alternatively, additional or other sensors may be configured to detect and track the movements of occupants who have left the vehicle, including the positions of these persons relative to the vehicle, the distances of these persons from the vehicle, and various other parameters relating to such persons.

Sensor system 28 may include locking mechanism sensors (generally designated 28c). Each locking mechanism sensor 28c may be configured to detect when an associated locking mechanism of an associated cargo area door actuates (i.e., enters one of a locked or unlocked condition), and also statuses (locked or unlocked) of any locking mechanism(s). Any suitable type of sensor may be used for these purposes, for example, conventional contact sensors.

Sensor system 28 may include cargo area door sensors (generally designated 28d) configured to detect when a cargo area door opens and closes, and also statuses (open or closed) of the cargo area doors. Any suitable type of sensor may be used for these purposes, for example, conventional contact sensors.

Cargo sensors (generally designated 28f) may be configured to detect the presence and absence of cargo in any of the vehicle cargo areas. For example, sensors such as cameras, proximity sensors, LIDAR sensors, weight sensors and/or other types of sensors may be mounted in the vehicle trunk and configured to detect the presence and absence of cargo in the trunk, and also various characteristics of the cargo (such as weight, volume, location within the trunk, etc.) in the trunk. Any suitable type of sensor may be used for these purposes.

Diagnostic sensors (generally designated 28e) of various types may be incorporated into the vehicle for diagnostic purposes as described herein. Also, existing sensors may be purposed for multiple tasks, one or more of which may include aiding the implementation of diagnostic procedures. For example, a field of view of a vehicle camera may encompass (or may be adjusted to encompass) a top surface of a vehicle trunk door. This may enable detection of an object positioned on top of the trunk door, which may prevent the trunk door from being opened responsive to a control command. Any suitable type of sensor may be used for diagnostic purposes.

The navigation system 23 can include one or more devices, applications, and/or combinations thereof, now known or later developed, configured to determine the geographic location of the vehicle 11 and/or to determine a travel route for the vehicle 11, for example, using vehicle occupant destination inputs in a known manner. The navigation system 23 can include one or more mapping applications to determine a travel route for the vehicle 11. The navigation system 23 can include a global positioning system, a local positioning system or a geolocation system. Vehicle navigation system 23 may include or be in operative communication with any sensor or sensors configured to estimate the geographic location of the vehicle 11.

Vehicle navigation system 23 may also be configured to operatively communicate with processor(s) 110, cargo area door control module 71, and/or autonomous driving module 160 to provide vehicle navigational information for the purposes described herein. In one or more arrangements, the vehicle navigation system 23 may be configured to determine when the vehicle 11 has arrived at a selected destination. For example, the navigation system 23 may (in a known manner) continuously monitor current GPS or other geographical coordinates of the vehicle 11 as the vehicle moves. These coordinates may be continuously compared to GPS or other geographical coordinates associated with the selected destination to determine if the two sets of coordinates coincide. Alternatively, the processor(s) 110 and/or cargo area door control module 71 may be configured to determine (in conjunction with and/or using information received from the navigation system 23) when the vehicle 10 has arrived at a selected destination.

Operation of one or more of the vehicle cargo area doors may be controllable, at least in part, responsive to a determination that the vehicle has arrived at a selected destination. A selected destination may be a destination of an occupant of the vehicle, or a destination of cargo being transported by the vehicle. For example, the selected destination may be the parking lot of a company or a hotel. The selected destination may be provided to the vehicle navigation system in any of a number of ways. For example, the selected destination may be entered into the navigation system by a vehicle occupant desiring to travel to the destination. An occupant may be an operator of the vehicle (i.e., a person enabled to control one or more aspects of vehicle operation) or a passenger of the vehicle (i.e., a person simply being transported by the vehicle). Alternatively, the selected destination may be entered by a human operator, computing system or other entity located at a site remote from the vehicle (for example, a prospective vehicle occupant or a human controller located at a remote facility).

A selected destination may be may be entered into the navigation system at any time before or after the vehicle begins, from a stationary condition, a movement or series of movements which will culminate in the vehicle arriving at the selected destination. For example, the selected destination may be provided before or after cargo is loaded into a vehicle cargo area, while the vehicle is stationary. In another example, the selected destination may be provided after all cargo area doors are closed and locked and the vehicle has started to move. The selected destination may also change during travel of the vehicle. The current or most recently provided selected destination may be stored in a suitable location buffer in the data store(s) 115, in the navigation system 23, or in another location for continuous comparison with the vehicle's current position.

Vehicle communication interfaces 16 may be configured to establish and enable continued and uninterrupted interaction between the vehicle 11 and external sensors, other vehicles, other computer systems, various external computing and communications systems and networks (such as communications network 101, a satellite system, a cellular phone/wireless communication system), remote entities, and off-vehicle facilities incorporating one or more of the capabilities described herein, and useable for performing one or more of the functions described herein.

Vehicle processor(s) 110 and modules (such as the cargo area door control module 71 and other modules) may operate (via vehicle communication interfaces 16) in a networked environment supporting connections to one or more remote computers, such as other computing systems, terminals and/or mobile devices (e.g., mobile phones, short-range vehicle communication systems, vehicle telematics devices and vehicle-to-vehicle communications systems) (not shown). Any other computing systems or devices in the vehicle and any related terminals or devices in operative communication with vehicle processor(s) 110 and/or any vehicle modules may include devices installed in vehicles, mobile devices that may travel within vehicles, or devices outside of vehicles that are configured to receive and process vehicle and driving data. Thus, any terminals or devices in communication with the vehicle 11 may each include personal computers (e.g., laptop, desktop, or tablet computers), servers (e.g., web servers, database servers, etc.), and other terminals or devices.

The communication interfaces 16 may include interfaces enabling communication in a wide area network (WAN), a wireless telecommunications network, and/or any other suitable communications networks (such as or including communications network 101, for example). Suitable communication network(s) can include wired communication links and/or wireless communication links. The communication network(s) can include any combination of the above networks and/or other types of networks. The communication network(s) can include one or more routers, switches, access points, wireless access points, and/or the like. In one or more arrangements, the communication network(s) can include Vehicle-to-Everything (V2X) technologies (including Vehicle-to-Infrastructure (V2I) and Vehicle-to-Vehicle (V2V) technologies), which can allow for communications between any nearby vehicle(s), and between the vehicle 11 and any nearby roadside communications nodes and/or infrastructure.

When used in a WAN networking environment, the vehicle processor(s) 110 and/or any vehicle modules may include (or be operatively connected to) a modem or other means for establishing communications over the WAN, such as network (e.g., the Internet). When used in a wireless telecommunications network, the vehicle processor(s) 110 and/or vehicle modules may include (or be operatively connected to) one or more transceivers, digital signal processors, and additional circuitry and software for communicating with wireless computing systems (not shown) via one or more network devices (e.g., base transceiver stations) in the wireless network. These configurations provide various ways of receiving a constant flow of information from (and transmitting a constant flow of information to) various external sources. The communication interfaces 16 may be incorporated into the vehicle processor(s) 110 and/or vehicle modules or may be located spaced apart from the vehicle processor(s) 110 and/or vehicle modules and communicatively coupled to the vehicle processor(s) 110 and/or vehicle modules.

In one or more arrangements, the communication interfaces 16 may be configured to enable and/or facilitate communications between the vehicle 11, one or more remotely located users (for example, via cellular or other communications modes), and remote facilities (such as facility 88) and operators and other entities exterior of the vehicle, via communications network 101. The communication interfaces 16 may be configured to enable remote control of aspects of the vehicle from remote facility 88 and/or by a user. For example, aspects of the cargo area door controls may be selected remotely by users or computing systems via the communication interfaces 16 and communications network 101.

The vehicle 11 may be configured so that the various controllers, sensors and other elements of the system can communicate with each other using a controller area network (CAN) bus 33 (FIG. 1) or the like. Via the CAN bus and/or other wired or wireless mechanisms, the processor(s) 110 may transmit messages to various devices in the vehicle and/or receive messages from the various devices, e.g., modules, actuators, sensors, etc. Alternatively, any of the elements and/or systems described herein may be directly connected to each other without the use of a bus. Also, connections between the elements and/or systems described herein may be through another physical medium (such as wired connections), or the connections may be wireless connections.

Referring again to FIG. 1, a remote facility 88 may be in operative communication with vehicle 11 via a communications network 101. Remote facility 88 may be configured to perform any of a variety of functions, such as remote control of the various aspects of vehicle operation, including selection of cargo area door control responses and conditions as described herein. For example, in one or more arrangements, remote facility 88 may include a computing system (not shown) configured to control autonomous operation of vehicle 11 as a "mobility as a service" (MaaS) vehicle, to pick up and transport passengers to selected destination(s).

The processor(s) 110, the sensor system 28, the navigation system 23 and/or the autonomous driving module(s) 160 can be operatively connected to communicate with the various vehicle systems 40 and/or individual components thereof. For example, returning to FIG. 1, the processor(s) 110, the sensor system 28 and/or the autonomous driving module(s) 160 can be in communication to send and/or receive information from the various vehicle systems 40 to control the movement, speed, maneuvering, heading, direction, and any other operations of the vehicle 11 needed to cause the vehicle to autonomously drive from a starting location to a selected destination. As used herein, "cause" or "causing" means to make, force, compel, direct, command, instruct, and/or enable an event or action to occur or at least be in a state where such event or action may occur, either in a direct or indirect manner. The processor(s) 110 and/or the autonomous driving module(s) 160 may control some or all of these vehicle systems 40 and, thus, may be partially or fully autonomous.

The processor(s) 110, the sensor system 28, the navigation system 23, and/or the autonomous driving module(s) 160 may be operable to control the navigation and/or maneuvering of the vehicle 11 by controlling one or more of the vehicle systems 40 and/or components thereof. For instance, when operating in an autonomous mode, the processor(s) 110, the sensor system 28 and/or the autonomous driving module(s) 160 can control the direction and/or speed of the vehicle 11. The processor(s) 110, the sensor system 28, and/or the autonomous driving module(s) 160 can cause the vehicle 11 to accelerate (e.g., by increasing the supply of fuel provided to the engine), decelerate (e.g., by decreasing the supply of fuel to the engine and/or by applying brakes) and/or change direction (e.g., by turning the front two wheels).

The autonomous driving module(s) 160 either independently or in combination with the navigation system 23 can be configured to determine travel path(s), current autonomous driving maneuvers for the vehicle 11, future autonomous driving maneuvers and/or modifications to current autonomous driving maneuvers based on data acquired by the sensor system 28 and/or data from any other suitable source. "Driving maneuver" means one or more actions that affect the movement of a vehicle. Examples of driving maneuvers include: accelerating, decelerating, braking, turning, moving in a lateral direction of the vehicle 11, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. The autonomous driving module(s) 160 can be configured to execute various vehicle functions and/or to transmit data to, receive data from, interact with, and/or control the vehicle 11 or one or more systems thereof (e.g., one or more of vehicle systems 40).

The vehicle cargo area doors control physical access to one or more associated vehicle cargo areas usable for storing and/or transporting cargo. The cargo area doors and associated control mechanisms may be operated autonomously (i.e., without human operation or manipulation of the doors or associated mechanisms), to unlock, open, close, and/or lock the doors and as otherwise described herein, responsive to various conditions or occurrences. In one or more arrangements, and as described herein, a locking mechanism of a cargo area door may also be autonomously deactivated or disabled so as to unlock the door if the door fails to unlock responsive to an "unlock" command. In addition, a closing mechanism of a cargo area door may be deactivated or disabled so as to enable the door to be opened manually if the door fails to open responsive to an "open" command.

The vehicle cargo area door control system may include any processors, modules, actuators, and/or other elements of the vehicle 11 described herein, which are needed to perform any of the autonomous cargo area door control functions described herein. Autonomous operation of the cargo area doors may be implemented by generation of one or more control commands directed to performing one or more of the cargo area door operations described herein (for example, unlocking, opening, closing, locking, disabling a door locking mechanism, disabling a door closing mechanism, diagnostics, etc.). The processor(s) 110, the sensor system 28, the navigation system 23, and/or the cargo area door control module 71 can be operatively connected to communicate with the various ones of actuators 150 and any other elements needed for controlling the vehicle cargo area doors as described herein.

Particular autonomous operations of any of the cargo area doors responsive to a given condition or occurrence may be selectable by a user. A user may be a human being who selects the cargo area door control operations to be autonomously implemented, and the conditions under which the selected control operations are to be implemented. The user may be a current vehicle occupant, such as a vehicle operator or passenger, who may select the cargo area door control operations and conditions using a vehicle human machine interface (HMI), a cellular phone interface connecting the user with the vehicle 11 (or with a remote vehicle control facility 88 in operative communication with the vehicle 11 via vehicle communication interfaces 16 and a communications network 101), or any other suitable communications means. The user may alternatively be a prospective vehicle occupant located remotely from the vehicle 11 and in operative communication with the vehicle 11 using one of the methods described above. In another arrangement, the cargo area door control operations to be autonomously implemented, and the conditions under which the selected control operations are to be implemented, may be determined autonomously (for example, by a vehicle element such as cargo area door control module 71) or by a remotely located computing system or other entity, based on various situational, environmental and/or other factors.

FIGS. 3A-4C are flow diagrams illustrating operations of one embodiment of a cargo area door control system to control the various vehicle cargo area doors, under various conditions. In the following description, the process flow will proceed from a current block to a following block when the condition(s) in the current block are met, or according to whether the condition stated in the current block is true or false. While the steps in the flow diagrams of the instant application may be described as applied to a single cargo area and cargo area door, it will be understood that these steps may be performed in relation to multiple cargo areas and/or cargo area doors of the vehicle, either sequentially or simultaneously.

In one or more arrangements, prior to a possible need for autonomous operation of the cargo area door-related systems to operate the cargo area doors, a user (such as a vehicle operator, an operator in a remote facility), or a computing system may select one or more cargo area operation control settings (designated "TS") from a menu of predetermined settings or values. The selected control setting(s) may determine the control commands to be generated and the conditions under which the commands will be generated (i.e., the events that will trigger generation of cargo area control commands). Thus, each of the predetermined cargo area operation control setting values may be associated with one or more conditions under which control commands will be generated. For example, a cargo area operation control setting may have a first predetermined value which may be associated with one or more first conditions. The cargo area operation control setting may alternatively have a second predetermined value which may be associated with one or more second conditions. Sets of conditions associated with different predetermined cargo area operation control setting values may include some conditions which are common to the sets of conditions and/or conditions which are different between the sets of conditions (i.e., conditions which are present in one set of conditions, but not in another set of conditions).

The settings in the following description are provided for purposes of illustration; any of a variety of other settings may be used. In the example shown, the settings may be selected by a user, operator, or computing system according to the following:

TS=1 (cargo area door control module 71 may unlock any (selected) cargo area door or all the cargo area door(s) if it is determined that the vehicle currently resides at a selected destination);

TS=2 (cargo area door control module 71 may unlock and open any (selected) cargo area door or all the cargo area door(s) if it is determined that the vehicle currently resides at a selected destination);

TS=3 (a state where no autonomous "unlock" or "unlock and open" control commands are set or in effect. This cargo area operation control setting may be actively selected by a user, cargo area door control module 71, or other authorized entity to deactivate any currently-active autonomous "unlock" or "unlock and open" control commands (such as TS=1, 2, 4, 5, or 6). With no such commands active, the cargo area doors may be operated manually or otherwise in a conventional manner, or by an operator in a remote facility. However, implementation of the TS=3 condition still permits one or more autonomous "close and lock" control commands (i.e., TS=7 and/or TS=8 or TS=9) to be active).

TS=4 (cargo area door control module 71 may unlock and open the cargo area door for any cargo area in which cargo is detected if it is determined that the vehicle currently resides at a selected destination);

TS=5 (cargo area door control module 71 may unlock and open the cargo area door for any cargo area in which cargo is detected if it is determined that the vehicle currently resides at a selected destination and a vehicle occupant compartment door has been opened since arriving at the selected destination);

TS=6 (cargo area door control module 71 may unlock and open the cargo area door for any cargo area in which cargo is detected if it is determined that the vehicle currently resides at a selected destination and a vehicle occupant is detected exiting a vehicle occupant compartment after arriving at the selected destination);

TS=7 (cargo area door control module 71 may close and lock the cargo area door for any cargo area in which cargo is detected if the door is open, when an occupant has exited an occupant compartment of the vehicle after arriving at the selected destination and the occupant who exited the occupant compartment has moved to at least a predetermined distance from the vehicle). This autonomous control command may aid in protecting cargo that a former vehicle occupant forgot to remove after her/she exited the vehicle;

TS=8 (cargo area door control module 71 may close and lock the cargo area door for any cargo area in which cargo is detected if the door is open, when an occupant has exited an occupant compartment of the vehicle and a predetermined time period has expired after the occupant exiting the occupant compartment of the vehicle). This autonomous control command may aid in protecting cargo that a former vehicle occupant forgot to remove after her/she exited the vehicle.

TS=9 (a state where no autonomous "close and lock" control commands are selected or set. This cargo area operation control setting may be actively selected by a user, computing system, or other authorized entity to deactivate any currently-active autonomous "close and lock" control commands (such as TS=7 and/or 8). With no such commands active, the cargo area doors may be operated manually or otherwise in a conventional manner). However, the TS=9 condition still permits one or more autonomous "unlock" or "unlock and open" control commands (i.e., TS=1-6) to be active.

TS=10 (the cargo area doors may be operated (i.e., unlocked, opened, closed, and/or locked) responsive to a direct command from a remote entity. In the particular example shown herein, responsive to generation or receipt of an instruction which will cause the vehicle to start moving, cargo area door control module 71 may determine if all vehicle cargo area doors are closed. If at least one cargo area door is not closed, the cargo area door control module 71 may generate a message to a remote entity (e.g., a remote user, operator or computing system) that at least one cargo area door is not closed. The cargo area door control module 71 may then receive (for example, from the at least one communications interface 16), responsive to the message to the remote entity that at least one cargo area door is not closed, a direct command to close the at least one cargo area door. The cargo area door control module 71 may then, responsive to receiving the command to close the at least one cargo area door, generate command(s) to or more actuators to close any open cargo area doors. Under this control command option, the same sequence of steps may then be repeated for locking the cargo area doors after they have been closed. An additional control command option (e.g., TS=11) may be provided to enable unlocking and opening of the cargo area doors in a similar manner, responsive to a direct command from a remote entity.

A given vehicle may be configured to implement a single one of the "unlock", "unlock and open" and/or "close and lock" settings described above, or more than one of the settings. For example, a first vehicle may be configured to enable selection and implementation of only setting TS=1, while a second, different vehicle may be configured to enable selection and implementation of either of settings TS=2 and TS=4. If a vehicle is configured to enable selection and implementation of any of settings TS=1, 2, 4, 5, and 6, the vehicle may also be configured to enable selection and implementation of setting TS=3, which deactivates all of the settings TS=1, 2, 4, 5, and 6. Similarly, if a vehicle is configured to enable selection and implementation of any of settings TS=7, 8, and 10, the vehicle may also be configured to enable selection and implementation of setting TS=9, which deactivates all of the settings TS=7, 8, and 10.

The cargo area door control module 71 may also be configured to, without any user or computing system input or selection, and responsive to generation of a command to the vehicle which will cause the vehicle to move, determine if a cargo area door is open. Then, whether or not there is cargo present in the cargo area associated with the open cargo area door, and responsive to a determination that a cargo area door is open, the cargo area door control module 71 may generate one or more control commands directed to closing and locking the open cargo area door. This may help ensure that an open cargo area door is closed prior to movement of the vehicle, in case a user fails to close the door after positioning cargo in the cargo area or removing cargo from the cargo area.

It may be noted that the cargo area door control module 71 may be set to any of cargo area operation control settings TS=1, 2, 3, 4, 5, or 6 in combination with either of cargo area operation control settings TS=7, 8, 9, or 10 because settings TS=1, 2, 3, 4, 5, and 6 relate to unlocking (or unlocking and opening) of a cargo area door from a closed or closed and locked condition, while cargo area operation control settings TS=7-10 relate to closing and locking a cargo area door from an open condition. It may also be noted that the cargo area door control module 71 may be set to either, neither, or both of cargo area operation control settings TS=7 and TS=8. Also, the cargo area door control module 71 may be set to any of (or none of) control settings TS=1, 2, 4, 5, or 6. In addition, selection of unlocking/opening control settings TS=1, 2, 3, 4, 5, or 6 may be done by a human user, a computing system, or a human user in combination with a computing system, while selection of closing/locking control settings TS=7 and/or TS=8, TS=9, or TS=10 may be done by another one of a human user, a computing system, or a human user in combination with a computing system.

Figure 3A:
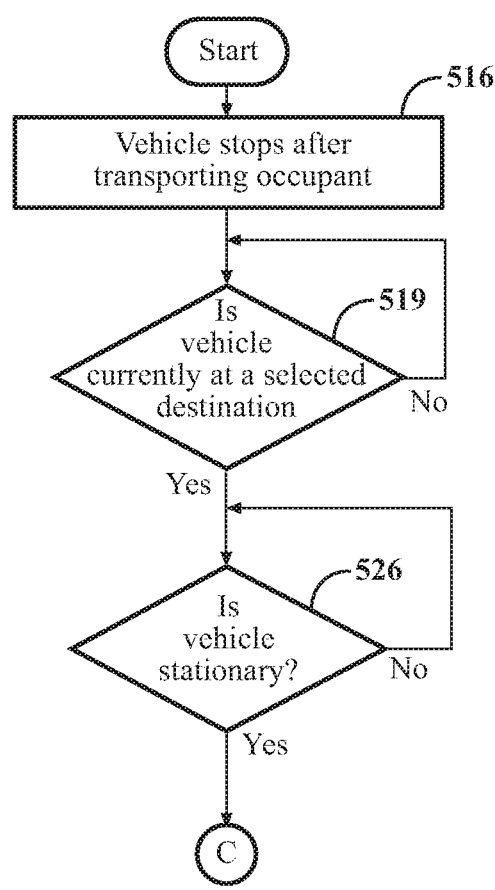
Figure 3B:
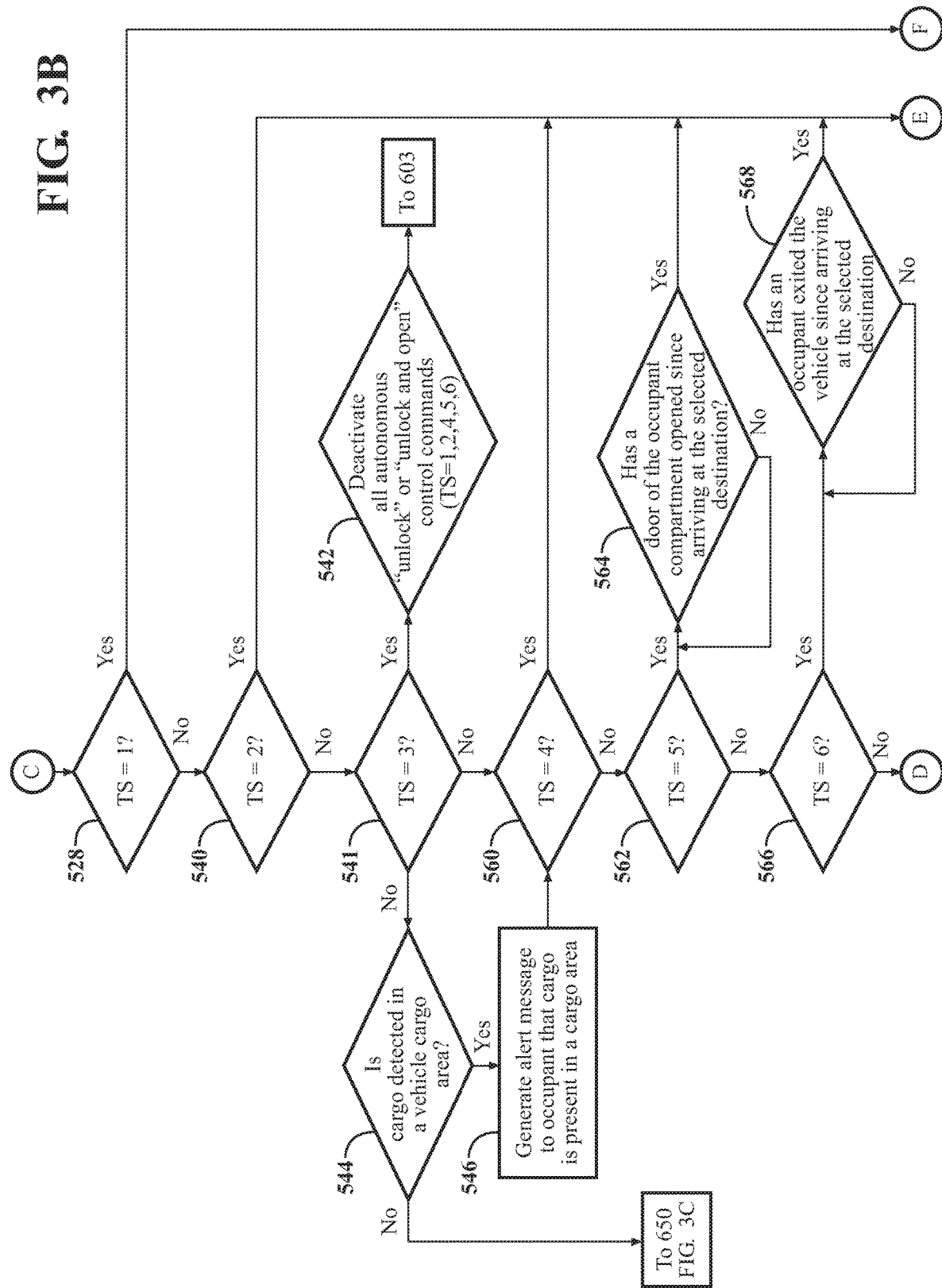

FIGS. 3A-3C in combination show a flow diagram illustrating the autonomous implementation of operations to control the unlocking and opening of a vehicle cargo area door after the vehicle has arrived at a selected destination. The cargo area door may be autonomously operated to unlock and/or open the cargo area regardless of the presence or absence of cargo in the cargo area.

Referring now to FIG. 3A, implementation of this aspect of vehicle control may begin (in block 516) when the vehicle stops after transporting the occupant and cargo. The vehicle processor(s) 110 and/or navigation system 23 may then determine (in block 519) if the vehicle is currently at a selected destination (for example, by determining if the vehicle currently resides at the selected destination currently stored in a location buffer prior to the trip which just terminated when the vehicle stopped). If the vehicle does not currently reside at the selected destination, control may loop back to block 519 until the vehicle currently resides at the selected destination.

If the vehicle currently resides at the selected destination, the cargo area door control module 71 may determine (in block 526) if the vehicle 11 is stationary. If the vehicle 11 is not stationary, the cargo area door control module 71 may continue to test for this condition until the vehicle is stationary. If the vehicle 11 is determined to be stationary, control may then transfer to block 528 (FIG. 3B), where the cargo area door control module 71 will start to determine which cargo area operation control setting TS is in effect, and then operate the vehicle according to the effective cargo area operation control setting TS.

In a particular embodiment, the cargo area door control module 71 may be configured to, if the vehicle resides at the selected destination, automatically implement control setting TS=2 to unlock and open any selected cargo area door(s) or all cargo area doors. In another particular embodiment, the cargo area door control module 71 may be configured to, as soon as a destination is selected, automatically implement control setting TS=2 to unlock and open any selected cargo area door(s) or all cargo area doors.

Referring to FIG. 3B, the cargo area door control module 71 may (in block 528) determine if the cargo area operation control setting TS is equal to 1. If the cargo area operation control setting is TS=1, the conditions (i.e., arrival of the vehicle at a selected destination) for unlocking the cargo area door have been met. Thus, the cargo area door control module 71 may then (in block 621, FIG. 3C) generate a control command to unlock (but not open) the cargo area door. The "unlock door" command may be sent to an actuatable locking mechanism which unlocks the cargo area door, as previously described. The cargo area door control module 71 may then check (in block 623, FIG. 3C) to verify if the cargo area door has been unlocked responsive to the "unlock door" command. If the cargo area door is unlocked, control may transfer to block 624 where the cargo area door control module 71 may control operation of the vehicle to prevent the vehicle from moving. Control may then pass to 605 (FIG. 3C) in which a message may be generated directed to informing a vehicle occupant that the cargo area door is unlocked and may now be opened manually. Following execution of block 605, control may proceed to block 650 (*end*).

However, returning to block 623, if the cargo area door is not unlocked, the cargo area door control module 71 may (in block 625, FIG. 3C) generate an alert message indicating that the cargo area door is not unlocked. The alert message may be transmitted (via HMI, for example) to vehicle occupants and/or may be sent to a remote site (via communication interfaces 16) or other entities as previously described, to inform user(s), remote vehicle control systems and/or other entities that the cargo area door has failed to unlock responsive to an unlock command.

Following generation of the alert message in block 625, the cargo area door control module 71 may (in block 627, FIG. 3C) operate a locking disablement mechanism to disable the cargo area door locking mechanism, thereby permitting the door to be opened manually. This enables the door to remain closed until the vehicle occupant is ready to open it, thereby concealing the cargo as protection from potential theft. The cargo area door control module 71 may then (in block 629) initiate running of a diagnostic to attempt to determine why the cargo area door unlocking mechanism did not unlock responsive to the "unlock" command. In one or more arrangements, blocks 625 and 629 may execute simultaneously. Following running of the diagnostic, the cargo area door control module 71 may (in block 631) generate an alert message to the vehicle occupants regarding why the cargo area door is not unlocked (if the reason has been determined by the diagnostic).

Returning to block 528 (FIG. 3B), if the cargo area operation control setting is not TS=1, the cargo area door control module 71 may determine (in block 540) if the cargo area operation control setting is TS=2. If the cargo area operation control setting is TS=2, the conditions (i.e., arrival of the vehicle at a selected destination) for unlocking and opening the cargo area door(s) have been met. Control may then proceed to block 607 (FIG. 3C). The cargo area door control module 71 may then (in block 607) determine (using sensor data, for example.) if it is currently raining or snowing onto the vehicle. If it is determined to be raining or snowing on the vehicle, the cargo area door control module 71 may execute the series of commands in blocks 621-631 as previously described, to unlock (but not open) the cargo area door. This leaves the door to be opened manually when the occupant is ready, thereby protecting the cargo from the elements.

Returning to block 607, if it is not raining or snowing on the vehicle, the cargo area door control module 71 may (in block 609) generate one or more commands to unlock and open the cargo area door. The cargo area door control module 71 may then (in block 611) check to verify that the cargo area door is actually open. If the cargo area door is open, control may transfer to block 612 where the cargo area door control module 71 may control operation of the vehicle to prevent the vehicle from moving. Control may then transfer to block 650 (end). However, if the cargo area door is not open, the cargo area door control module 71 may (in block 613) generate an alert message as previously described indicating that the cargo area door is not open. The cargo area door control module 71 may then (in block 615) operate locking and/or closing disablement mechanism(s) to disable the cargo area door locking and/or closing mechanisms, thereby permitting the door to be opened manually.

The cargo area door control module 71 may then (in block 617) initiate running of a diagnostic to attempt to determine why the cargo area door unlocking mechanism did not unlock the cargo area door responsive to the "unlock" command (if there was a failure of the door to unlock), and/or to determine why the cargo area door opening mechanism did not open the cargo area door responsive to the "open" command (if there was a failure of the door to open). In one or more arrangements, blocks 613 and 617 may execute simultaneously. Following running of the diagnostic, the cargo area door control module 71 may (in block 619) generate one or more alert messages to the vehicle occupants regarding why the cargo area door is not unlocked and/or opened (if the reason has been determined by the diagnostic).

Returning to block 540 (FIG. 3B), if the cargo area operation control setting is not TS=2, the cargo area door control module 71 may determine (in block 541) if the cargo area operation control setting is TS=3. If the cargo area operation control setting is TS=3, the cargo area door control module 71 may (in block 542) deactivate all autonomous "unlock" or "unlock and open" control commands (TS=1, 2, 4, 5, and/or 6). Thus, any previously-selected or currently-active autonomous "unlock" or "unlock and open" control commands (i.e., associated with settings TS=1, 2, 4, 5, or 6) will no longer be executed, and the cargo area doors may be operated manually or otherwise in a conventional manner until a new "unlock" or "unlock and open" control command setting (i.e., TS=1, 2, 4, 5, or 6) is selected. TS=3 may also be a default value for the "unlock" or "unlock and open" control command setting in case of a system reboot or similar occurrence, or if a user or computing system fails to make an alternative selection. After such a system reset, active selection of an autonomous cargo area operation control setting may be required. Following execution of block 542, control may proceed to block 603 (FIG. 3C), to generate a message directed to informing a vehicle occupant or other entity (for example, a remote entity) that the door may be unlocked manually. The cargo area door control module 71 may then (in block 605, FIG. 3C) generate a message directed to informing a vehicle occupant or other entity (for example, an operator or a computing system at a remote facility) that the cargo area doors may be opened manually.

Returning to block 541 (FIG. 3B), if the cargo area operation control setting is not TS=3, the cargo area door control module 71 may determine (in block 544) if cargo has been detected in any of the vehicle cargo areas. If no cargo is detected in any of the vehicle cargo areas then, under any of the control settings TS=4, 5, or 6, the cargo area door will not need to be opened. In this case, control may proceed to block 650 (FIG. 3C, "End"). However, if cargo is detected in any of the vehicle cargo areas, the cargo area door control module 71 may (in block 546, FIG. 3B) generate an alert message that cargo is present in a vehicle cargo area. The alert message may indicate the cargo area(s) in which cargo has been detected. Control may then proceed to block 560 (FIG. 3B).

The cargo area door control module 71 may determine (in block 560) if the cargo area operation control setting is TS=4. If the cargo area operation control setting is TS=4, the conditions (i.e., the presence of cargo in the cargo area and arrival of the vehicle at a selected destination) for unlocking and opening the cargo area door(s) have been met. Control may then proceed to block 607, where the cargo area door control module 71 will attempt to unlock and open cargo area door(s) as previously described for area(s) where cargo has been detected.

Returning to block 560 (FIG. 3B), if the cargo area operation control setting is not TS=4, the cargo area door control module 71 may determine (in block 562) if the cargo area operation control setting is TS=5. If the cargo area operation control setting is TS=5, the cargo area door control module 71 may wait until the opening of a vehicle occupant compartment door (to permit the exit of an occupant) is detected, after arrival at the selected destination. When (in block 564) it has been determined that a vehicle occupant compartment door has been opened, the conditions for unlocking and opening of the cargo area door(s) under TS=5 will have occurred (i.e., the presence of cargo in a cargo area, arrival of the vehicle at a selected destination, and the opening of a vehicle occupant compartment door). Control may then transfer to block 607 (FIG. 3C) previously described, from which control proceeds based on whether or not it is currently snowing or raining on the vehicle.

Returning to block 562 (FIG. 3B), if the cargo area operation control setting is not TS=5, the cargo area door control module 71 may determine (in block 566) if the cargo area operation control setting is TS=6. If the cargo area operation control setting is TS=6, the cargo area door control module 71 may (in block 568) wait until an occupant is detected exiting the vehicle. When it is determined that an occupant has exited the vehicle, the conditions for unlocking and opening of the cargo area door(s) under TS=6 will have occurred (i.e., the presence of cargo in a cargo area, arrival of the vehicle at a selected destination, and the detection of a vehicle occupant exiting the vehicle). Control may then transfer to block 607 previously described, from which control proceeds based on whether or not it is currently snowing or raining on the vehicle.

However, if the cargo area operation control setting is not TS=1, 2, 3, 4, 5, or 6, the cargo area door control module 71 may assume that no control setting was selected (or is in effect) for automatically opening the cargo area door after arrival at a selected destination. The cargo area door control module 71 may then (in block 603, FIG. 3C) generate a message directed to informing a vehicle occupant that the door may be unlocked manually. The cargo area door control module 71 may then (in block 605, FIG. 3C) generate a message directed to informing a vehicle occupant that the door may be opened manually.

Figure 4A:
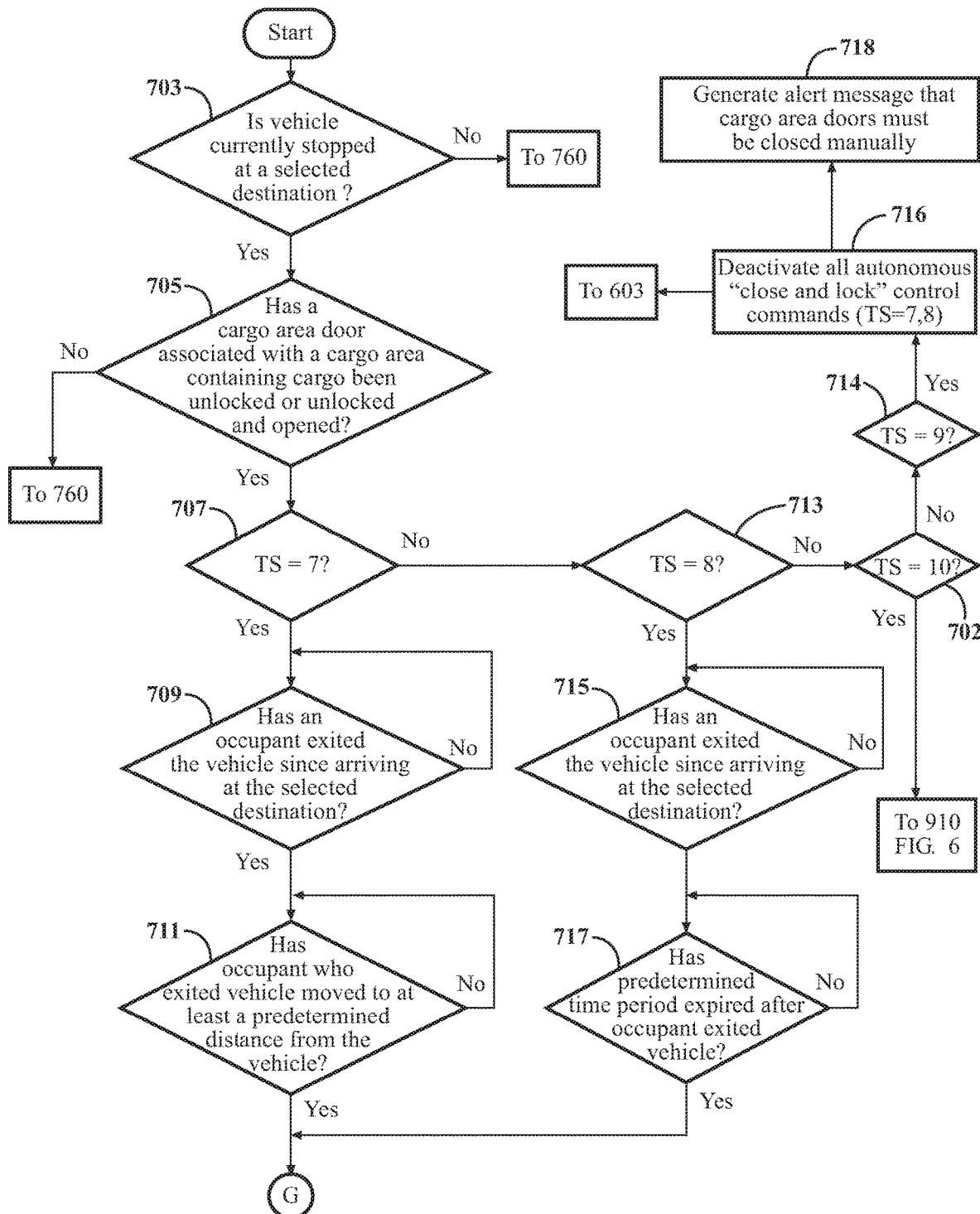
Figure 4B:
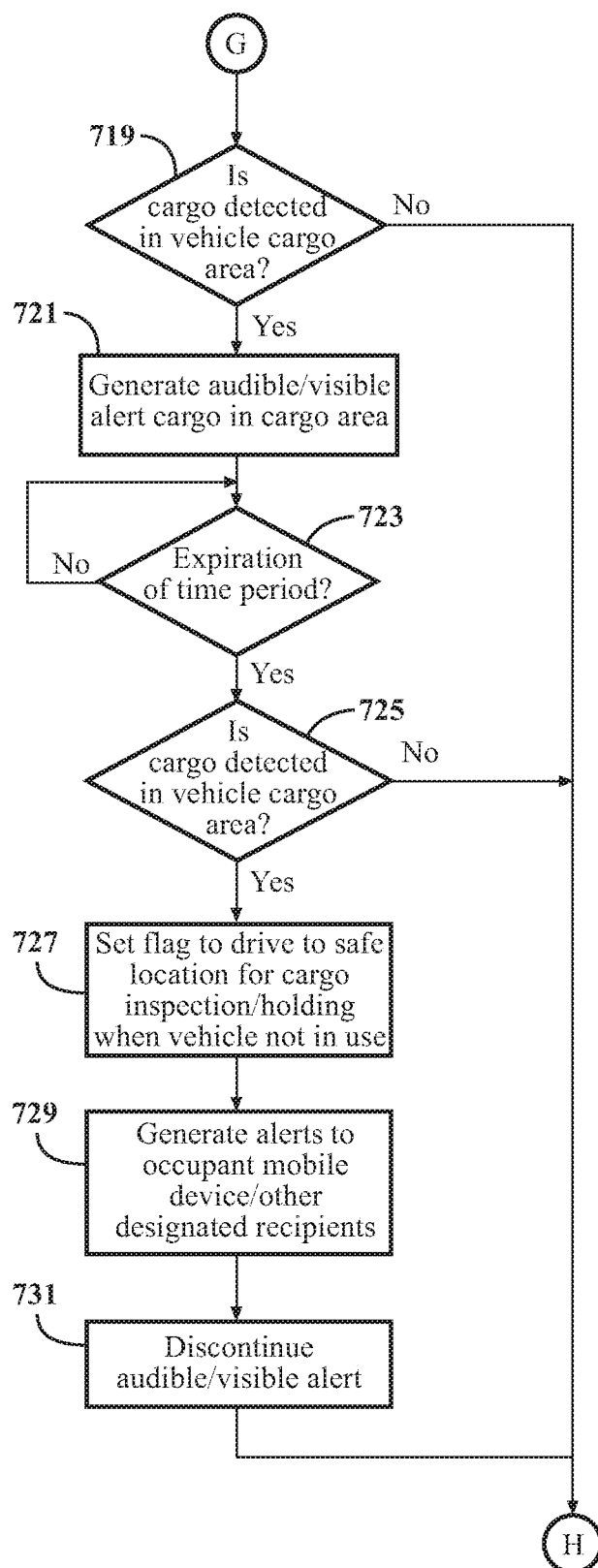

FIGS. 4A-4C in combination show a flow diagram illustrating the autonomous implementation of operations to aid in preventing a vehicle occupant from forgetting or leaving cargo in a vehicle cargo area after the occupant has exited the vehicle. The blocks or steps shown in FIGS. 4A-4C may occur after the blocks or steps just described with regard to FIGS. 3A-3C.

Referring now to FIG. 4A, the cargo area door control module 71 may determine (in block 703) if the vehicle is currently stopped at a selected destination. If the vehicle is not currently stopped at a selected destination, control may pass to block 760 (FIG. 4C). If the vehicle is currently stopped at a selected destination, the cargo area door control module 71 may determine (in block 705) if a cargo area door associated with a cargo area containing cargo has been unlocked or unlocked and opened since arriving at the selected destination. If a cargo area door associated with a cargo area containing cargo has not been unlocked or unlocked and opened, control may pass to block 760 (FIG. 4C).

However, if a cargo area door associated with a cargo area containing cargo has been unlocked or unlocked and opened since arriving at the selected destination, the cargo area door control module 71 may determine (in block 707) if the cargo area operation control setting is TS=7. If the cargo area operation control setting is TS=7, the cargo area door control module 71 may (in block 709, FIG. 4A) wait until an occupant is detected exiting the vehicle. When it is determined that an occupant has exited the vehicle, the cargo area door control module 71 may determine (in block 711 (FIG. 4A), using suitable sensors provided in sensor system 28) if the occupant who has exited the vehicle has moved to at least a predetermined distance from the vehicle. If the occupant who has exited the vehicle does not move to at least a predetermined distance from the vehicle, control may continuously loop back to block 711 until the occupant who exited the vehicle has moved to at least a predetermined distance from the vehicle.

If the occupant who has exited the vehicle has moved to at least a predetermined distance from the vehicle, the cargo area door control module 71 may (in block 719, FIG. 4B) determine if there is cargo in any vehicle cargo area. If there is cargo in any vehicle cargo area, the cargo area door control module 71 may (in block 721, FIG. 4B) generate an audible and/or visible alert directed to informing the person who exited the vehicle (and/or a vehicle occupant) that there is cargo in a cargo area. This may serve as a reminder to a person who has exited the vehicle but forgotten to remove their cargo from the cargo area. For example, the alert may comprise flashing taillights or operating the vehicle horn in a predetermined manner. Referring back to block 719, if there is no cargo detected in any vehicle cargo area, control may proceed to block 733 of FIG. 4C (described below).

The cargo area door control module 71 may then (in block 723, FIG. 4B) wait a predetermined time period after initiation of the alert in block 721. This may give the occupant an opportunity to extract the cargo from the cargo area. After expiration of the predetermined time period, the cargo area door control module 71 may (in block 725, FIG. 4B) determine if the cargo still resides in the cargo area (i.e., the system may determine whether or not the cargo was removed from the cargo area after the alert). If cargo is still detected in the cargo area, the cargo area door control module 71 may (in block 727) set a flag indicating that the vehicle should be driven to a safe location for inspection and holding of the cargo during a period when the vehicle is not in use. For example, the vehicle may drive autonomously to the safe location, or a human operator may drive the vehicle (either manually or semi-autonomously) to the safe location when an opportunity arises.

The cargo area door control module 71 may then (in block 729, FIG. 4B) generate an alert to any mobile device belonging to the former vehicle occupant or another entity, and/or to any other entities on a predetermined list of entities to be notified if cargo is left in the vehicle by an occupant who has exited the vehicle. The cargo area door control module 71 may then (in block 731, FIG. 4B) discontinue generation of the audible/visible alert.

Referring now to FIG. 4C, if no cargo is detected in the cargo area in block 725 of FIG. 4B (and also following block 731 of FIG. 4B), the cargo area door control module 71 may (in block 733, FIG. 4C) generate one or more commands to close and lock the cargo area door. Automatic closing and locking of the cargo area door ensures that the cargo area door will not unintentionally open during movement of the vehicle. The cargo area door control module 71 may then determine (in block 735) if vehicle cargo area door is closed, responsive to the command to close and lock the cargo area door. If the cargo area door is not closed, the system may (in block 747) generate an alert message as previously described indicating that the cargo area door is not closed, thereby enabling any vehicle occupants and/or other entities to take appropriate action (for example, refraining from moving the vehicle and/or taking steps to close the door). The system may then (in block 749) initiate running of a diagnostic to attempt to determine why the cargo area did not close. Following running of the diagnostic, the system may (in block 751) generate an alert message to occupants and/or other entities (such as a service provider) regarding why the cargo area is not closed (if the reason has been determined by the diagnostic). Blocks 747 and 749 may be executed simultaneously or sequentially as shown. The cargo area door control module 71 may then cycle back to block 735, to determine if the cargo area door is still open.

Returning to block 735 (FIG. 4C), if the cargo area door is closed, the cargo area door control module 71 may (in block 737) determine if the cargo area door is locked. If the cargo area door is not locked, the system may (in block 741) generate an alert message as previously described to occupants and/or other entities indicating that the cargo area door is not locked, thereby enabling any vehicle occupants, former occupants, or other entities to take appropriate action (for example, refraining from moving the vehicle and/or taking steps to lock the door). The system may then (in block 743) initiate running of a diagnostic to attempt to determine why the cargo area did not lock. Blocks 741 and 743 may be executed simultaneously or sequentially as shown. Following running of the diagnostic, the system may (in block 745) generate an alert message to occupants and/or other entities regarding why the cargo area is not locked (if the reason has been determined by the diagnostic). The cargo area door control module 71 may then cycle back to block 737, to determine if the cargo area door is still unlocked. By cycling back to blocks 735 and 737, the cargo area door control module 71 will determine when the cargo area door has been closed (block 735) and locked (block 737) as previously described. When these conditions have been met, control may pass to block 739.

Returning to block 737 (FIG. 4C), if the cargo area door is closed and locked, the cargo area door control module 71 may (in block 739) control operation of the vehicle to permit the vehicle to start moving.

Returning to block 725 (FIG. 4B), if no cargo is detected in the vehicle cargo area, control may transfer to (and proceed from) block 733 (FIG. 4C), as previously described.

Returning to block 719 (FIG. 4B), if no cargo is detected in the vehicle cargo area, control may transfer to (and proceed from) block 733 (FIG. 4C), as previously described.

Returning to block 707 (FIG. 4A), if the cargo area operation control setting is not TS=7, the cargo area door control module 71 may determine (in block 713) if the cargo area operation control setting is TS=8. If the cargo area operation control setting is TS=8, the cargo area door control module 71 may (in block 715) wait until an occupant is detected exiting the vehicle. When it is determined that an occupant has exited the vehicle, the cargo area door control module 71 may determine (in block 717) if a predetermined time or wait period has expired after the occupant exiting the vehicle. After expiration of the predetermined time period, control may transfer to (and proceed from) block 719 (FIG. 4B), as previously described.

Figure 6:
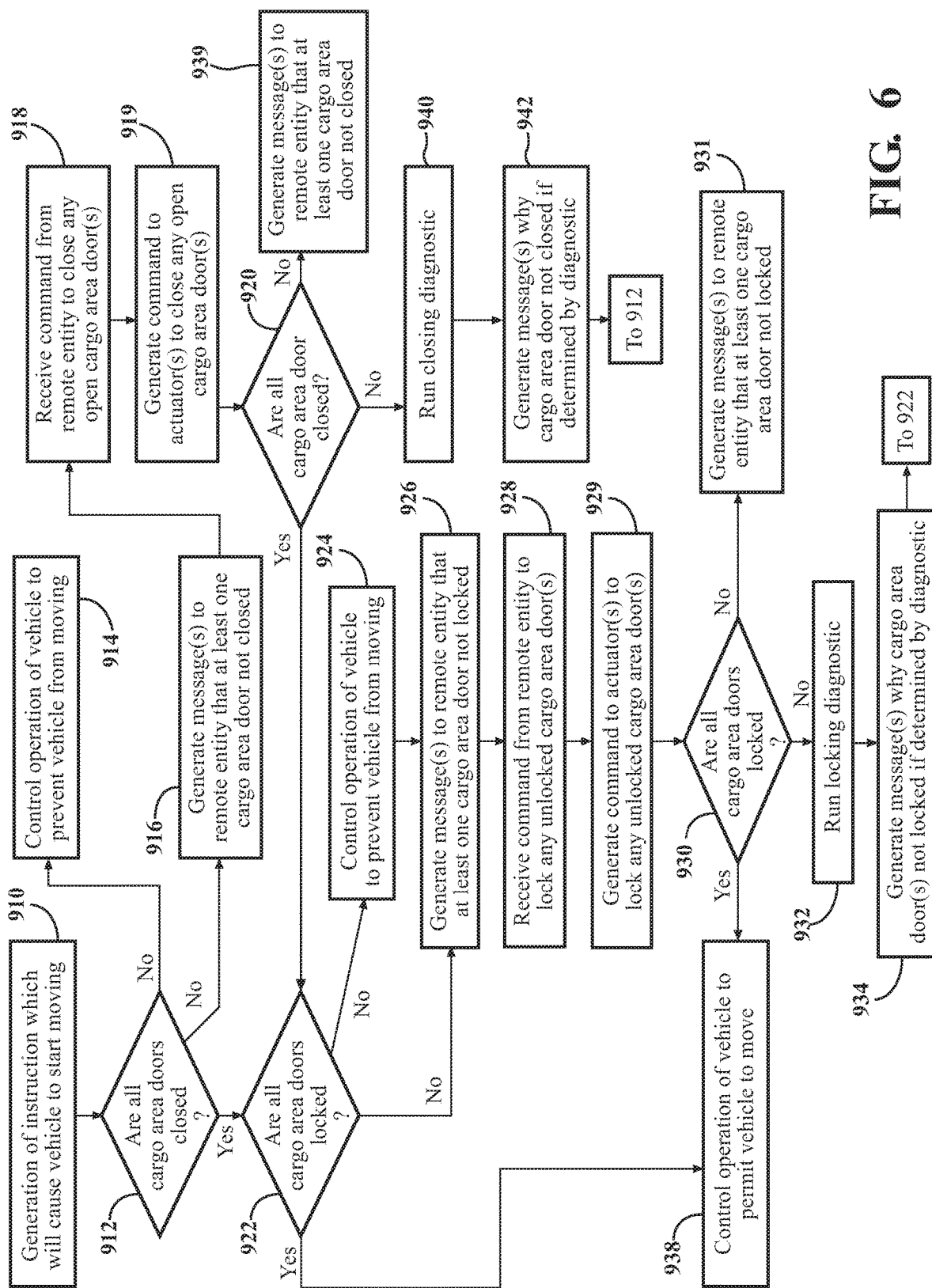
FIG. 6 is a schematic flow diagram illustrating the autonomous implementation of operations in an example where a direct command from a remote entity is required to operate one or more cargo area doors in a desired manner (for example, to close the cargo area door(s)).

Returning to block 713 (FIG. 4A), if the cargo area operation control setting is not TS=8, the cargo area door control module 71 may determine (in block 702) if the cargo area operation control setting is TS=10. Referring to FIG. 6, if the cargo area operation control setting is TS=10, the cargo area door control module 71 may (in block 910) await the generation of an instruction which will cause the vehicle to start moving. When such an instruction is generated, the cargo area door control module 71 may (in block 912) determine if all cargo area doors are closed. If all cargo area doors are not closed, the cargo area door control module 71 may (in block 914) control operation of the vehicle to prevent vehicle from moving. At the same time, the cargo area door control module 71 may (in block 916) generate one or more message(s) to a remote entity (for example, a human operator at a remote facility) that at least one cargo area door not closed.

Following generation of the message in block 916, the cargo area door control module 71 may (in block 918) await receipt of a command from the remote entity to close any open cargo area door(s). Following receipt of a command from the remote entity to close any open cargo area door(s), the cargo area door control module 71 may (in block 919) generate one or more commands to actuator(s) to close any associated open cargo area door(s). The cargo area door control module 71 may then (in block 920) determine if all cargo area doors are closed. If all cargo area doors are not closed, the cargo area door control module 71 may (in block 939) generate one or more alert messages as previously described indicating that at least one cargo area door is not closed, thereby enabling any vehicle occupants or other entities to take appropriate action (for example, taking steps to close the door(s)). The cargo area door control module 71 may also (in block 940) initiate running of a diagnostic to attempt to determine why one or more cargo area doors are not closed. Following running of the diagnostic, the cargo area door control module 71 may (in block 942) generate an alert message regarding why any open cargo area door(s) are not closed (if the reason(s) have been determined by the diagnostic). Blocks 939 and 940-942 may be executed simultaneously or sequentially as shown.

Returning to block 912, if it is determined in block 912 that all cargo area doors are closed, the cargo area door control module 71 may (in block 922) determine if all cargo area doors are locked. If all cargo area doors are not locked, the cargo area door control module 71 may (in block 924) control operation of the vehicle to prevent vehicle from moving. At the same time, the cargo area door control module 71 may (in block 926) generate one or more message(s) to a remote entity (for example, a human operator at a remote facility) that at least one cargo area door not locked.

Following generation of the message in block 926, the cargo area door control module 71 may (in block 928) await receipt of a command from the remote entity to lock any unlocked cargo area door(s). Following receipt of a command from the remote entity to lock any unlocked cargo area door(s), the cargo area door control module 71 may (in block 929) generate one or more commands to actuator(s) to lock any associated unlocked cargo area door(s). The cargo area door control module 71 may then (in block 930) determine if all cargo area doors are locked. If all cargo area doors are locked, the cargo area door control module 71 may (in block 938) control operation of the vehicle to permit the vehicle to move. However, if all cargo area doors are not locked, the cargo area door control module 71 may (in block 931) generate one or more alert messages as previously described indicating that at least one cargo area door is not locked, thereby enabling any vehicle occupants or other entities to take appropriate action (for example, taking steps to lock the door(s)). The cargo area door control module 71 may also (in block 932) initiate running of a diagnostic to attempt to determine why one or more cargo area doors are not locked. Following running of the diagnostic, the cargo area door control module 71 may (in block 934) generate an alert message regarding why any open cargo area door(s) are not locked (if the reason(s) have been determined by the diagnostic). Blocks 931 and 932-934 may be executed simultaneously or sequentially as shown.

In one or more examples, the cargo area door control module 71 may be configured to generate a separate command to the appropriate actuators to close and/or lock associated cargo area doors in cases where the command or signal received from the remote entity is not suitable for direct transmission to the actuators for execution (for example, in cases where the command must be reformatted or otherwise changed in form in order to be executed by the actuators).

In one or more alternative arrangements, instead of generating suitable "close" and/or "lock" commands to the appropriate actuators responsive to "close" and/or "lock" commands received from the remote entity, the cargo area door control module 71 may be configured to convey "close" and/or "lock" commands received from the remote entity (via the communications interfaces 16) to the appropriate actuators, to close and or lock associated ones of the cargo area doors. In this case, the command(s) are simply routed through the cargo area door control module 71 to the actuators for cases where, for example, the actuators are not configured to receive and/or implement commands sent directly from the remote entity. In this case, the cargo area door control module 71 may function as a "pass-through" device.

Returning to block 702 (FIG. 4A), if the cargo area operation control setting is not TS=10, the cargo area door control module 71 may determine (in block 714) if the cargo area operation control setting is TS=9. If the cargo area operation control setting is TS=9, the cargo area door control module 71 may (in block 716) deactivate all autonomous "close and lock" control commands (i.e., TS=7, 8 or 10). Thus, any previously selected or currently-active autonomous "close and lock" control commands will no longer be executed, and the cargo area doors may be operated manually or otherwise in a conventional manner until a new "close and lock" control command setting (TS=7, 8 or 10) is selected. TS=9 may also be a default value for the "close and lock" control command setting in case of a system reboot or similar occurrence, or if a user or computing system fails to make an alternative selection. After such a system reset, active selection of an autonomous cargo area operation control setting may be required. Following execution of block 716, control may proceed to block 718 to generate a message directed to informing a vehicle occupant or other entity (such as an operator or a computing system at a remote facility) that the cargo area door(s) must be closed manually.

Figure 5:
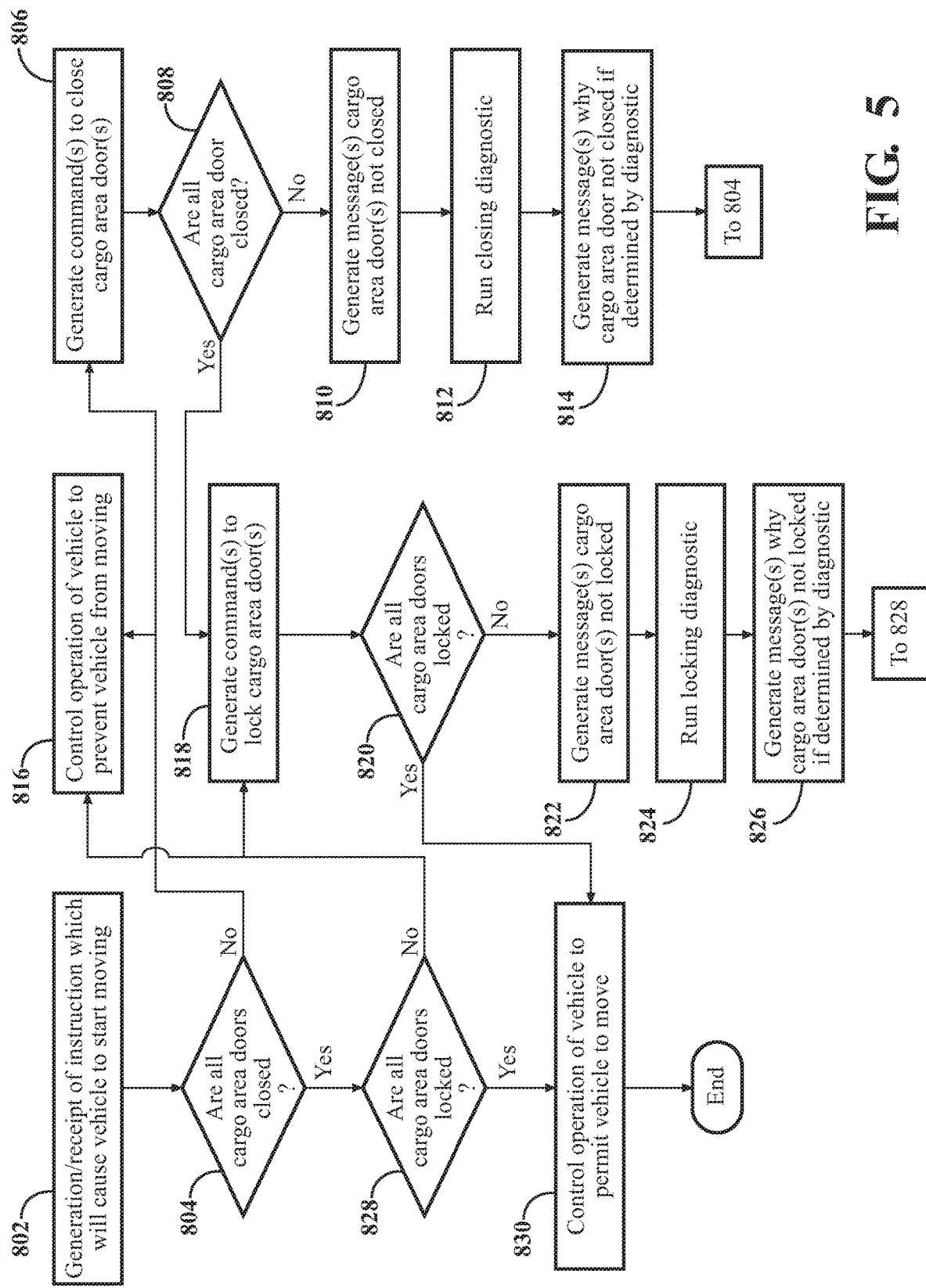
FIG. 5 shows a flow diagram illustrating the autonomous implementation of operations to determine if a cargo area door is currently either open or closed and unlocked, and to close and lock any open doors prior to movement of the vehicle.

FIG. 5 shows a flow diagram illustrating the autonomous implementation of operations to determine if any vehicle cargo area doors are currently either open or closed and unlocked, and to close and lock any open doors prior to movement of the vehicle. These actions may be performed responsive to the generation or receipt of an instruction (such as, for example, application of pressure to an accelerator pedal of the vehicle by a user, or a command generated remotely (such as at remote facility 88) to operate the accelerator pedal to inject fuel into the engine to move the vehicle) which will cause the stationary vehicle to start moving. An instruction that may cause the vehicle to start moving may also originate from the autonomous driving module 160. Such a scenario in which movement of the vehicle is initiated may occur, for example, after arrival at a destination and removal of any cargo from a cargo area, but before the vehicle leaves the current location to proceed to another destination. Such a scenario may also occur, for example, when the vehicle is parked at a parking lot or garage and is about to leave the parking area. In such a case, it is desired to have the cargo area doors closed and locked prior to movement. Implementation of the operations shown in FIG. 5 is directed to ensuring that vehicle cargo areas are closed and locked prior to putting the vehicle in motion. In addition, the blocks or steps shown in FIG. 5 may be executed with respect to any or all of the vehicle cargo area doors. These blocks or steps may be executed on a single cargo area door that is determined to be open or unlocked, or on multiple (or all) open or unlocked cargo area doors simultaneously. In one or more arrangements, the blocks or steps shown in FIG. 5 may be performed responsive to a selection (for example, from a menu) by a user of a control option configured to autonomously control operation of the cargo area doors based on the "open" or "closed" status of the doors as described in FIG. 5.

Referring to FIG. 5, the cargo area door control module 71 may (in block 802) receive command(s) or instruction(s) which may cause the vehicle to move. The instruction(s) may be relayed to the cargo area door control module 71 as well as to other systems or modules in the vehicle. Any vehicle module or system capable of generating a command which will (or may) result in the vehicle moving may be configured to send a copy of such a signal to the cargo area door control module 71. Also, any instruction received by any portion of the vehicle and which may result in movement of the vehicle may be relayed to the cargo area door control module 71. In addition, the cargo area door control module 71 may be configured to receive commands originating from outside the vehicle via the communications interface 16.

After receiving the command which may cause the vehicle to move, the cargo area door control module 71 may then (in block 804, FIG. 5) determine if all of the vehicle cargo area doors are currently closed. A cargo area door may be open, for example, if cargo has recently been extracted from the associated cargo area after arriving at the current location.

If one or more of the cargo area doors are not closed, the cargo area door control module 71 may generate (in block 806) one or more commands to close any open cargo area doors. The cargo area door control module 71 may then determine (in block 808) if the vehicle cargo area doors are closed, responsive to the command to close the cargo area doors. If all of the cargo area doors are not closed, the cargo area door control module 71 may (in block 810) generate one or more alert messages as previously described indicating that all of the cargo area doors are not closed, thereby enabling any vehicle occupants or other entities to take appropriate action (for example, taking steps to close the door(s)). The cargo area door control module 71 may then (in block 812) initiate running of a diagnostic to attempt to determine why one or more cargo area doors are not closed. Following running of the diagnostic, the cargo area door control module 71 may (in block 814) generate an alert message regarding why any open cargo area door(s) are not closed (if the reason(s) have been determined by the diagnostic). Blocks 810 and 812-814 may be executed simultaneously or sequentially as shown.

Returning to block 804, simultaneously with generating command(s) to close any open cargo area door(s) if all of the cargo area doors are not closed, cargo area door control module 71 may (in block 816) autonomously control operation of the vehicle to prevent the vehicle from moving until the open cargo area door(s) have been closed and locked. The cargo area door control module 71 may be configured to interact with other vehicle elements or modules to prevent execution of the "move vehicle" command(s). For example, the cargo area door control module 71 may be configured to control operation of the vehicle so as to interdict or prevent fuel from being provided to the engine responsive to pressure on the gas pedal or a command generated by remote facility 88. In one or more arrangements, the necessary control may be exercised by the cargo area door control module 71 generating an interdiction signal to the control module(s) and/or system(s) controlling elements of the vehicle tasked with responding to the instruction which would cause the vehicle to start moving (for example, the throttle or propulsion system). Such an interdiction command would operate to prevent a response by the other control module(s) and/or system(s) that would normally result in moving the vehicle, until the cargo area door has been closed and locked. The cargo area door control module 71 may also (or alternatively) be configured to actively control operation of the vehicle to prevent the vehicle from moving, for example by generating a command to braking system 42 to apply the brakes or a command to transmission system 45 to shift the transmission to "park".

Returning to block 808, if all of the cargo area doors were closed responsive to the "close door(s)" command(s), the cargo area door control module 71 may (in block 818) generate a command to lock the cargo area doors. The cargo area door control module 71 may then (in block 820) determine if all cargo area doors are locked responsive to the "lock doors" command. If the cargo area doors are not locked, the cargo area door control module 71 may (in block 822) generate one or more alert messages as previously described indicating that all of the cargo area doors are not locked, thereby enabling any vehicle occupants, former occupants, or other entities to take appropriate action (for example, taking steps to lock the door(s)). The cargo area door control module 71 may then (in block 824) initiate running of a locking diagnostic to attempt to determine why the cargo area door(s) are not locked. Following running of the diagnostic, the cargo area door control module 71 may (in block 826) generate one or more alert messages regarding why the cargo area door(s) are not locked (if the reason(s) have been determined by the diagnostic). Blocks 822 and 824-826 may be executed simultaneously or sequentially as shown.

Returning to block 820, if it is determined that the cargo area doors are locked, the cargo area door control module 71 may (in block 830) autonomously control operation of the vehicle to permit the vehicle to move responsive to any instructions(s) which may cause the vehicle to move. This may be achieved, for example, by the cargo area door control module 71 generating one or more signals to other modules and/or elements of the vehicle withdrawing, discontinuing or superseding a "stop vehicle movement" command previously generated by the cargo area door control module 71.

Referring back to block 804, if the cargo area doors are determined to be closed, the cargo area door control module 71 may (in block 828) determine if the cargo area doors are locked. If the cargo area doors are not locked, control may transfer to blocks 816 and 818 (previously described), where commands may be generated to lock the cargo area doors (block 818) and to prevent the vehicle from moving (block 816) responsive to any "vehicle movement" command(s). Control may proceed from block 818 as previously described.

Returning to block 828, if the cargo area doors are locked, the cargo area door control module 71 may (in block 830) autonomously control operation of the vehicle to permit the vehicle to move responsive to any instructions(s) which may cause the vehicle to move In one or more arrangements, a manual override function (not shown) may be provided to enable a user to override commands preventing the vehicle from moving responsive to detection of an open or unlocked cargo area door. This function may enable operation of the vehicle in an emergency, for example.

Although autonomous operation of the cargo area doors is described herein as being responsive to the occurrence of any of several user-selectable conditions, it will be understood that the vehicle computing and other systems may be configured to permit operation of the cargo area door responsive to user-selectable conditions other than those specified herein.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4C, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module, as envisioned by the present disclosure, is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A vehicle cargo area door control system for a vehicle including at least one cargo area and at least one cargo area door configured to be movable to enable physical access to the at least one cargo area, and movable to block physical access to the at least one cargo area, the control system comprising:
   one or more processors; and
   a memory communicably coupled to the one or more processors and storing a cargo area door control module including instructions that when executed by the one or more processors cause the one or more processors to:
   determine if the vehicle currently resides at a selected destination;
   responsive to a determination that the vehicle currently resides at the selected destination, operate a cargo area door unlocking mechanism to unlock the at least one cargo area door;
   determine if there is cargo present in the at least one cargo area; and
   responsive to a determination that there is cargo present in the at least one cargo area, operate a cargo area door opening mechanism to open the at least one cargo area door.

2. The vehicle cargo area door control system of claim 1 wherein the cargo area door control module further includes instructions that when executed by the one or more processors cause the one or more processors to:
   determine if a door of an occupant compartment of the vehicle is currently open; and
   responsive to determinations that there is cargo present in the cargo area and a door of the vehicle occupant compartment of the vehicle is currently open, operate the cargo area door opening mechanism to open the at least one cargo area door.

3. The vehicle cargo area door control system of claim 1 wherein the cargo area door control-module further includes instructions that when executed by the one or more processors cause the one or more processors to:
   determine if a vehicle occupant has exited the vehicle; and
   responsive to determinations that there is cargo present in the cargo area and a vehicle occupant has exited the vehicle, operate the cargo area door opening mechanism to open the at least one cargo area door.

4. The vehicle cargo area door control system of claim 1 wherein the cargo area door control module further includes instructions that when executed by the one or more processors cause the one or more processors to operate a closing mechanism to close the at least one cargo area door.

5. The vehicle cargo area door control system of claim 4 wherein the cargo area door control module further includes instructions that when executed by the one or more processors cause the one or more processors to:
   determine if the at least one cargo area door is open, responsive to a control command to open the at least one cargo area door; and
   if the at least one cargo area door is not open, operate a closing disablement mechanism to disable the closing mechanism, the closing disablement mechanism being configured to, responsive to one or more control commands, disable the closing mechanism of the at least one cargo area door so that the closing mechanism will not prevent the at least one cargo area door from being opened.

6. The vehicle cargo area door control system of claim 5 wherein the cargo area door control module further includes instructions that when executed by the one or more processors cause the one or more processors to, if the at least one cargo area door is not open, initiate running of a diagnostic to attempt to determine why the at least one cargo area door did not open responsive to the control command; and
   if a reason why the at least one cargo area door did not open responsive to the control command is determined by the diagnostic, generate an alert message regarding why the at least one cargo area door did not open responsive to the control command.

7. The vehicle cargo area door control system of claim 4 wherein the cargo area door control module further includes instructions that when executed by the one or more processors cause the one or more processors to operate a locking mechanism to lock the at least one cargo area door.

8. The vehicle cargo area door control system of claim 1 wherein the cargo area door control module further includes instructions that when executed by the one or more processors cause the one or more processors to:

determine if the at least one cargo area door is unlocked, responsive to one or more control commands to a cargo door unlocking mechanism to unlock the at least one cargo area door; and if the at least one cargo area door is not unlocked, operate a locking disablement mechanism to disable a locking mechanism of the at least one cargo area door so as to unlock the at least one cargo area door;

if the at least one cargo area door is not unlocked, initiate running of a diagnostic to attempt to determine a reason why the at least one cargo area door did not unlock responsive to the one or more control commands;

if a reason why the at least one cargo area door did not unlock responsive to the one or more control commands is determined by the diagnostic, generate an alert message regarding why the at least one cargo area door did not unlock responsive to the one or more control commands.

9. A computer-implemented method of operating at least one cargo area door of a vehicle, the at least one cargo area door being configured to be movable to enable physical access to an associated cargo area of the vehicle, and also movable to block physical access to the associated cargo area, the vehicle including an unlocking mechanism configured to, responsive to one or more control commands, autonomously unlock the at least one cargo area door, the method comprising steps of:

determining if the vehicle currently resides at a selected destination; and responsive to a determination that the vehicle currently resides at the selected destination, operating the unlocking mechanism to unlock the at least one cargo area door;

determining if there is cargo present in the at least one cargo area; and responsive to a determination that there is cargo present in the at least one cargo area, operating a cargo area door opening mechanism to open the at least one cargo area door.

10. The method of claim 9 wherein the vehicle includes a closing mechanism configured to, responsive to one or more control commands, close the at least one cargo area door, and wherein the method further comprises the step of operating the closing mechanism to close the at least one cargo area door.

11. The method of claim 10 wherein the vehicle includes a locking mechanism configured to, responsive to one or more control commands, lock the at least one cargo area door, and wherein the method further comprises the step of operating the locking mechanism to lock the at least one cargo area door.

* * * * *